(12) United States Patent
Ramanandan et al.

(10) Patent No.: US 10,371,530 B2
(45) Date of Patent: Aug. 6, 2019

(54) SYSTEMS AND METHODS FOR USING A GLOBAL POSITIONING SYSTEM VELOCITY IN VISUAL-INERTIAL ODOMETRY

(71) Applicant: QUALCOMM Incorporated, San Diego, CA (US)

(72) Inventors: Arvind Ramanandan, Sunnyvale, CA (US); Murali Chari, San Diego, CA (US); Avdhut Joshi, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 15/703,483

(22) Filed: Sep. 13, 2017

(65) Prior Publication Data

US 2018/0188032 A1    Jul. 5, 2018

Related U.S. Application Data

(60) Provisional application No. 62/442,388, filed on Jan. 4, 2017.

(51) Int. Cl.
| | | |
|---|---|---|
| *G01C 21/10* | (2006.01) | |
| *G01C 21/16* | (2006.01) | |
| *G01S 19/52* | (2010.01) | |
| *G01S 19/49* | (2010.01) | |
| *G01S 19/53* | (2010.01) | |

(52) U.S. Cl.
CPC ............ *G01C 21/165* (2013.01); *G01S 19/49* (2013.01); *G01S 19/52* (2013.01); *G01S 19/53* (2013.01)

(58) Field of Classification Search
None
See application file for complete search history.

(56) References Cited

U.S. PATENT DOCUMENTS

| | | |
|---|---|---|
| 9,031,782 B1 | 5/2015 | Lemay et al. |
| 2014/0316698 A1 | 10/2014 | Roumeliotis et al. |
| 2014/0341465 A1 | 11/2014 | Li et al. |

(Continued)

OTHER PUBLICATIONS

International Search Report and Written Opinion—PCT/US2017/057866—ISA/EPO—dated Feb. 1, 2018.

(Continued)

*Primary Examiner* — Bhavesh V Amin
(74) *Attorney, Agent, or Firm* — Austin Rapp & Hardman, P.C.

(57) ABSTRACT

A method performed by an electronic device is described. The method includes determining a predicted velocity relative to Earth corresponding to a first epoch using a camera and an inertial measurement unit (IMU). The method also includes determining, using a Global Positioning System (GPS) receiver, a GPS velocity relative to Earth. The method further includes determining a difference vector between the predicted velocity and the GPS velocity. The method additionally includes refining a bias estimate and a scale factor estimate of IMU measurements proportional to the difference vector. The method also includes refining a misalignment estimate between the camera and the IMU based on the difference vector. The method further includes providing pose information based on the refined bias estimate, the refined scale factor, and the refined misalignment estimate.

30 Claims, 9 Drawing Sheets

(56) References Cited

U.S. PATENT DOCUMENTS

2016/0005164 A1 1/2016 Roumeliotis et al.
2017/0031032 A1 2/2017 Garin et al.

OTHER PUBLICATIONS

Niesen U., et al., "Qualcomm Research: Robust Positioning from Visual-Inertial and GPS", Explore, Jan. 19, 2017, Retrieved from internet on Feb. 27, 2017, http://gpsworld.com/qualcommresearch robustpositioningfromvisualinertialandgps/, pp. 1-7.

SYSTEMS AND METHODS FOR USING A GLOBAL POSITIONING SYSTEM VELOCITY IN VISUAL-INERTIAL ODOMETRY

RELATED APPLICATION

This application is related to and claims priority to U.S. Provisional Patent Application Ser. No. 62/442,388, filed Jan. 4, 2017, for "SYSTEMS AND METHODS FOR USING A GLOBAL POSITIONING SYSTEM VELOCITY IN VISUAL-INERTIAL ODOMETRY."

FIELD OF DISCLOSURE

The present disclosure relates generally to electronic devices. More specifically, the present disclosure relates to systems and methods for Global Positioning System (GPS) velocity in visual-inertial odometry (VIO).

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, healthcare equipment, set-top boxes, etc.) capture and/or utilize images. For example, a smart phone may capture and/or process still and/or video images. Processing images may demand a relatively large amount of time, memory, and energy resources. The resources demanded may vary in accordance with the complexity of the processing.

In some cases, images may be utilized in computer vision applications. For example, computer vision may be utilized to detect objects. However, computer vision may suffer from some limitations. As can be observed from this discussion, systems and methods that improve computer vision may be beneficial.

SUMMARY

A method performed by an electronic device is described. The method includes determining a predicted velocity relative to Earth corresponding to a first epoch using a camera and an inertial measurement unit (IMU). The method also includes determining, using a Global Positioning System (GPS) receiver, a GPS velocity relative to Earth. The method further includes determining a difference vector between the predicted velocity and the GPS velocity. The method additionally includes refining a bias estimate and a scale factor estimate of IMU measurements proportional to the difference vector. The method also includes refining a misalignment estimate between the camera and the IMU based on the difference vector. The method further includes providing pose information based on the refined bias estimate, the refined scale factor estimate, and the refined misalignment estimate. The misalignment estimate may include a translation displacement estimate and a rotation displacement estimate. The pose information may include a 6 degrees of freedom (DOF) camera pose. A vehicle may include the electronic device.

The method may include determining a second predicted velocity corresponding to a second epoch using the camera and the IMU based on the refined bias estimate, the refined scale factor estimate, and the refined misalignment estimate. The method may include obtaining an error metric indicating an uncertainty in the GPS velocity. The method may also include weighting the GPS velocity in a Kalman filter based on the error metric.

A predicted velocity error may be bounded based on the GPS velocity. The GPS velocity may be utilized to reduce visual-inertial odometry (VIO) drift.

The method may include rejecting at least one of a set of GPS velocities based on at least one of a set of difference vectors. The method may include rejecting at least one of a set of GPS velocities based on an error metric.

An electronic device is also described. The electronic device includes a memory and a processor coupled to the memory. The processor is configured to determine a predicted velocity relative to Earth corresponding to a first epoch using a camera and an inertial measurement unit (IMU). The processor is also configured to determine, using a Global Positioning System (GPS) receiver, a GPS velocity relative to Earth. The processor is further configured to determine a difference vector between the predicted velocity and the GPS velocity. The processor is additionally configured to refine a bias estimate and a scale factor estimate of IMU measurements proportional to the difference vector. The processor is also configured to refine a misalignment estimate between the camera and the IMU based on the difference vector. The processor is further configured to provide pose information based on the refined bias estimate, the refined scale factor estimate, and the refined misalignment estimate.

A non-transitory tangible computer-readable medium storing computer executable code is also described. The computer-readable medium includes code for causing an electronic device to determine a predicted velocity relative to Earth corresponding to a first epoch using a camera and an inertial measurement unit (IMU). The computer-readable medium also includes code for causing the electronic device to determine, using a Global Positioning System (GPS) receiver, a GPS velocity relative to Earth. The computer-readable medium further includes code for causing the electronic device to determine a difference vector between the predicted velocity and the GPS velocity. The computer-readable medium additionally includes code for causing the electronic device to refine a bias estimate and a scale factor estimate of IMU measurements proportional to the difference vector. The computer-readable medium also includes code for causing the electronic device to refine a misalignment estimate between the camera and the IMU based on the difference vector. The computer-readable medium further includes code for causing the electronic device to provide pose information based on the refined bias estimate, the refined scale factor estimate, and the refined misalignment estimate.

An apparatus is also described. The apparatus includes means for determining a predicted velocity relative to Earth corresponding to a first epoch using a camera and an inertial measurement unit (IMU). The apparatus also includes means for determining a GPS velocity relative to Earth. The apparatus further includes means for determining a difference vector between the predicted velocity and the GPS velocity. The apparatus additionally includes means for refining a bias estimate and a scale factor estimate of IMU measurements proportional to the difference vector. The apparatus also includes means for refining a misalignment estimate between the camera and the IMU based on the difference vector. The apparatus further includes means for providing pose information based on the refined bias estimate, the refined scale factor estimate, and the refined misalignment estimate.

DETAILED DESCRIPTION

Figure 1:
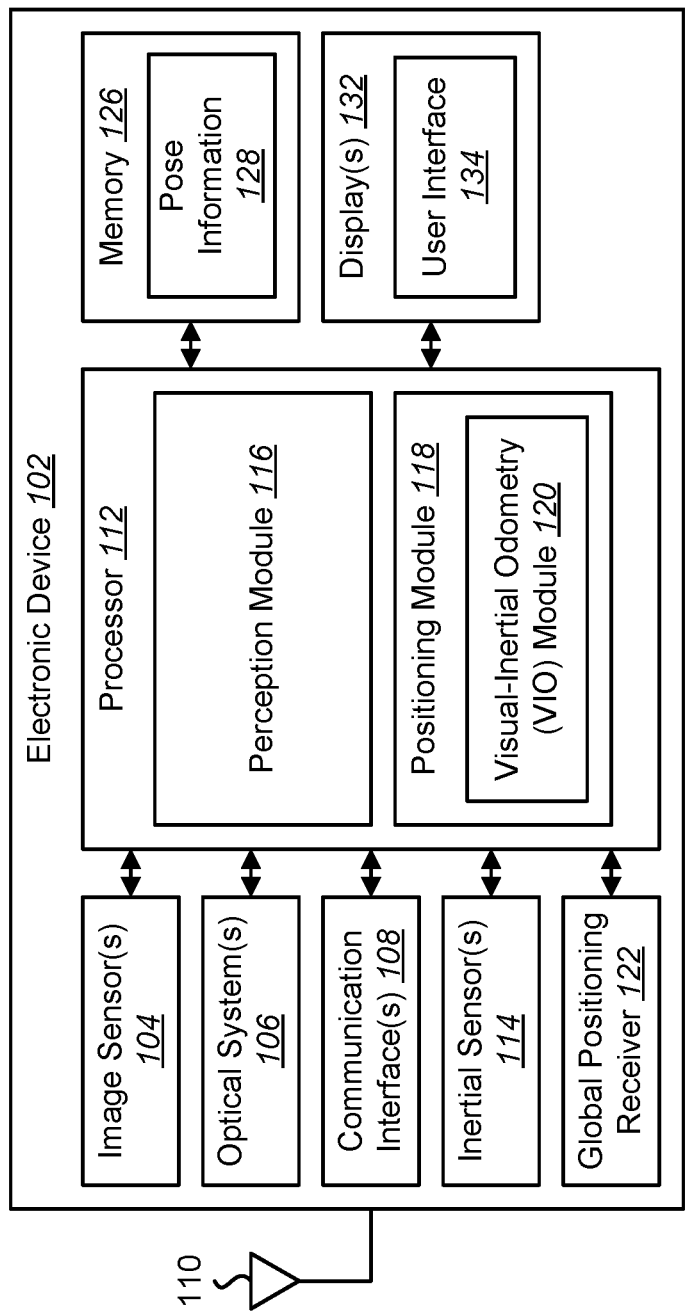
FIG. 1 is a block diagram illustrating one example of an electronic device in which systems and methods for using a Global Positioning System (GPS) in visual-inertial odometry (VIO) may be implemented.

Some configurations of the systems and methods disclosed herein may relate to using Global Positioning System (GPS) velocity to aid in visual-inertial odometry (VIO). VIO may enable highly precise positioning and mapping capability with a set of economically viable sensors and processors, as compared to other highly expensive solutions. Specifically, VIO may fuse information from at least a camera and inertial sensor(s) (e.g., gyroscopes and accelerometers), to estimate device pose.

In one example, a vehicle may be equipped with a VIO system to enable autonomous driving. The VIO system may utilize images from the environment and inertial sensor measurements to determine vehicle movement. As the vehicle drives, errors from the VIO system may grow. For example, inertial changes may be so small that they may not be reliably measured with inertial sensors due to measurement noise. Additionally, images from the environment may not include enough features to enable reliable visual tracking. For instance, driving on a highway with very few visual features (e.g., a flat landscape) may not enable reliable visual tracking over a sufficient period to allow accurate calculation of vehicle movement. Due to these issues, significant errors from the VIO system may occur, resulting in an inability to accurately determine vehicle movement, orientation (e.g., heading), and scale of the environment (e.g., distances between objects). These errors may cause the autonomously driving vehicle to fail (e.g., veer off course), since the vehicle may not have an accurate sense of position, movement, or of the environment.

In order to address these problems, the vehicle may be equipped with a GPS. The GPS may be utilized to limit the error growth of the VIO system. For example, the GPS may provide an independent measurement of vehicle position and movement (e.g., velocity). The GPS measurement may be utilized to correct the VIO measurement error. For example, the GPS measurement may provide a limit to the VIO measurement error growth. Limiting the error may provide the autonomously driving vehicle with an accurate sense of position, movement, and the environment, which may enable the vehicle to more accurately stay on course. In some configurations, the VIO system and GPS may operate in a complementary fashion. For example, in scenarios where there are more visual features (e.g., buildings, landmarks, etc.), the VIO system may offer greater accuracy, although GPS satellites may be obstructed and provide less reliable measurements. In scenarios where there are fewer visual features (e.g., few landmarks or buildings, etc.), the GPS may limit the error (e.g., drift) in VIO measurement.

VIO may have advantages over other techniques. For example, a single camera may be able to estimate relative position, but it may not be able to provide absolute scale (e.g., actual distances between objects and/or the size of objects (in meters or feet, for example)). Inertial sensors may provide absolute scale and may take measurement samples at a higher rate in some configurations, thereby improving robustness for fast device motion. However, sensors, particularly low-cost micro-electro-mechanical systems (MEMS) varieties, may be prone to substantial drifts in position estimates compared to cameras. Accordingly, VIO may combine camera and inertial sensor inputs to accurately estimate device pose.

VIO may or may not also be used with a GPS and/or GNSS (Global Navigation Satellite System). As used herein, the terms "GPS" and "GNSS" may be used interchangeably to refer to a global satellite positioning system. In addition to economic advantages, the accuracy of VIO may provide advantages over pure GPS. For example, pure GPS may degrade significantly in a multipath environment, especially in deep urban scenarios.

VIO may suffer from multiple problems (particularly in automotive scenarios, for example). One problem is that if the inertial sensor (e.g., accelerometer) measurements are not sufficiently excited (e.g., the vehicle moves at constant velocity), the scale of the estimated translations and sparse maps may drift in an unbounded fashion. In turn, this may imply that the displacements from VIO to a GPS fusion engine may grow with time. Additionally or alternatively, the availability of visual features may be limited and/or sparse in some scenarios (e.g., on freeways). Moreover, the constant 'refresh' of features (e.g., feature tracks having limited time span) may contribute to the scale drifts (e.g., drifts in distance, meters, feet, etc., for example) over time. Additionally, the orientation drift in VIO around the gravity vector may also be unbounded in nature. For example, the heading (e.g., yaw) measurement error may grow in an unlimited fashion.

In order to address these problems, especially on freeways, VIO may benefit from a clean and independent measurement of scale and global orientation. Accordingly, some configurations of the present systems and methods may use a GPS velocity vector (e.g., speed and/or heading) and/or an associated quality metric, as an input measurement into VIO. This measurement may be incorporated as part of an extended Kalman filter (EKF) update to a VIO engine. Notably, GPS velocity may be computed as a derivative of a carrier phase measurement, so it may not be affected by multipath as is the case with pseudoranges. For example, when GPS satellite signals are obstructed and/or reflect off of one or more obstructions, the measured distances (or pseudoranges) between the GPS receiver and one or more satellites may be subject to multipath errors. Carrier phase measurement (e.g., carrier wave tracking) of the satellite signals may be a relative measurement with a bounded error. Accordingly, GPS velocity based on carrier phase may avoid the multipath problem.

GPS velocity may be a globally available measurement of orientation and scale. As used herein, the term "GPS velocity" refers to a measure of speed and direction that is derived from at least one satellite signal. GPS velocity may be estimated with uncertainties on the order of a few (e.g., 10-100) centimeters per second (cm/s) along each axis. In some implementations, the GPS velocity may be computed in a GPS receiver. The GPS velocity may be used for fusion. In other words, in contrast to VIO without GPS, some configurations of the present systems and methods use GPS velocity to constrain drifts in scale and orientation in a VIO system.

Some configurations of the systems and methods disclosed herein may beneficially improve the accuracy of positioning and mapping (e.g., low cost positioning and mapping). For example, there is a demand for precise positioning and mapping for vehicle-to-vehicle or vehicle-to-infrastructure (V2X) applications, advanced driver assistance systems (ADAS), and/or autonomous vehicles at low cost.

Some approaches may provide precise positioning using GPS/GNSS, VIO, and/or mapping. Precise mapping may rely on precise positioning, precise feature localization based on computer vision (CV) (e.g., triangulation, bundle adjustment (BA), etc.). For example, autonomous driving tasks may include precise positioning, perception, and/or planning. Perception based on sensor data may provide detection and tracking of obstacles in a local environment. Precise ego-positioning and mapping may provide semantic information to help understand the constraints from a road network. A planning and motion control layer, which is a functional layer in a device for route planning and motion control (e.g., steering), may decide the right action based on inputs from the perception and ego-positioning tasks. Precise positioning, which may include ego-positioning and/or positioning data for other tasks (e.g., mapping), may include delivering absolute vehicle location in a GPS global coordinate system and/or relative vehicle pose in a map coordinate system. Precise mapping may include delivering cost effective solutions to collect, generate, and/or update map features.

Mapping may be an element of autonomous driving. In some approaches, a map may include semantic information (which may help a vehicle to understand the road network constraints) and/or localization features (which may help a vehicle to localize itself precisely).

Mapping to support autonomous driving may include depth (e.g., a rich semantic representation of the environment), accuracy (e.g., precise positioning of map elements), and/or freshness (e.g., an ability to process, recognize, and/or update map elements in real-time or near real-time). How to deliver accurate maps in real-time (or near real-time) is a key challenge for the industry to commercialize autonomous driving.

One or more technologies may be utilized to enable precise positioning. For example, a sensor sync board may enable tight synchronization and accurate timestamping over multiple sensors (e.g., IMU, GPS, and/or camera). Additionally or alternatively, visual inertial odometry (VIO) and/or tight coupling GPS/GNSS with VIO may enable precise positioning. Additionally or alternatively, fusion with localization features in maps may enable precise positioning. For example, GPS and VIO positioning may be fused with signs and/or lane markers to enable accurate positioning.

Visual-inertial odometry (VIO) may be utilized for accurate localization. For instance, VIO may be utilized to accurately compute a 6 degrees of freedom (DOF) pose (e.g., a camera pose, a vehicle pose, etc.). The pose may be computed in a spatial frame (e.g., relative frame) and/or in a global frame of reference. A spatial frame may be a frame relative to an arbitrary point that may be fixed relative to Earth. A spatial frame may be a referred to as a relative frame because the spatial frame is relative to an arbitrary point (e.g., starting point, position of a sensor at time t=0, etc.). A global frame of reference is a frame relative to the Earth. One example of an approach to VIO is provided as follows. Camera frames (e.g., a monocular camera with VGA resolution at 30 frames per second (fps)) may be provided for three-dimensional (3D) feature processing. For example, a processor may estimate 3D features (e.g., corners and/or keypoints with depth) based on the camera frames. Accelerometer measurements (e.g., samples at 100 hertz (Hz) or more, 200 Hz, etc.) and gyroscope measurements (e.g., samples at 100 Hz or more, 200 Hz, etc.) may be provided to inertial data processing. The 3D feature processing and inertial data processing outputs may be provided to a main VIO system for continuous localization and/or camera and inertial sensor data fusion. The outputs of VIO may include a 6 DOF pose (e.g., relative position and/or orientation at 30 Hz, for instance). For example, outputs may include rotation (3 axes) and/or translation (3 dimensions) relative to a global frame, inertial sensor biases, a gravity vector, and/or a sparse 3D map of feature points. Feature points may be corners, keypoints, etc., in an image that may relate to an object in the real world. VIO may be implemented on a smartphone, tablet, robot, VR platform, and/or automotive platform, for example.

A rationale for sensor fusion is given as follows. Inertial sensors parameters (e.g., bias, scale, non-orthogonality, and/or misalignment) may need continuous estimation. Vision sensing may be accurate, but may need a sufficient amount of features. Also scale (e.g., scale in meters, feet, inches, etc.) may not be determinate in vision sensing alone. Sensor fusion may combine higher rate (e.g., 100 Hz, 200 Hz, 500 Hz, etc.) inertial measurements and fewer accurate features in some configurations. Inertial sensors and/or VIO may provide measurements at a higher rate (e.g., 100 Hz, 200 Hz, 500 Hz, etc.) in comparison to GPS (e.g., 1 Hz, 5 Hz, 10 Hz, etc.).

Some challenges to VIO for an automotive platform may include one or more of the following. Implementations in an automotive environment may address initialization and crash recovery, may reduce/improve scale drift during lack of observability of IMU measurements, may provide robustness to non-rigid scenes (e.g., rigid road with moving vehicles), may provide outlier rejection (e.g., rejection of erroneous measurements), and/or may provide modeling of a non-holonomic system. In some configurations, the outliers being rejected may be erroneous GPS pseudoranges that are due to multipath. Challenges for an automotive camera may include rolling shutter motion compensation and/or wide dynamic range (WDR) and multiple exposures, as they may introduce timing errors. For example, rolling shutter may introduce timing errors due to sequential sampling and/or readout of pixels, where an image frame is obtained over a range of time and not at one instant. WDR and multiple exposures may introduce timing errors, as WDR may be handled by combining multiple exposures over time.

In some configurations, additional sensors may be utilized for enhanced robustness. For example, lidar may be coupled with visual odometry. Additionally or alternatively, car sensors may be used, such as wheel encoders and wheel direction. A goal for automotive platforms may be to achieve low drift in relative 6 DOF pose in the automotive environment. The 6 DOF pose may be relative to a starting point (e.g., position at time t=0).

VIO and GPS fusion may be utilized to achieve high performance with cost effective sensors in some configurations. For example, GPS/GNSS measurements and local/relative coordinate measurements from VIO may be tightly coupled to achieve highly accurate global positioning. Some configurations may integrate accurate measurements over time.

Some configurations of the systems and methods described herein may include accurate and highly optimized VIO, an optimized algorithm using an extended Kalman filter, accurate time stamping, and/or efficient processing by using a digital signal processor (DSP).

Various configurations are now described with reference to the Figures, where like reference numbers may indicate functionally similar elements. The systems and methods generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for using a Global Positioning System (GPS) in visual-inertial odometry (VIO) may be implemented. Examples of the electronic device 102 include vehicles (e.g., semi-autonomous vehicles, autonomous vehicles, etc.), automobiles, robots, aircraft, drones, unmanned aerial vehicles (UAVs), servers, computers (e.g., desktop computers, laptop computers, etc.), network devices, cameras, video camcorders, digital cameras, cellular phones, smart phones, tablet devices, personal cameras, wearable cameras, virtual reality devices (e.g., headsets), augmented reality devices (e.g., headsets), mixed reality devices (e.g., headsets), action cameras, surveillance cameras, mounted cameras, connected cameras, healthcare equipment, gaming consoles, appliances, etc. The electronic device 102 may include one or more components or elements. One or more of the components or elements may be implemented in hardware (e.g., circuitry), a combination of hardware and software (e.g., a processor with instructions), and/or a combination of hardware and firmware.

In some configurations, the electronic device 102 may be a vehicle or may be included in a vehicle configured to produce pose information (e.g., object location information, object position information, object orientation information, camera pose information, vehicle pose information, mapping information, etc.). For example, the electronic device 102 may determine pose information based on VIO and GPS. In some configurations, the electronic device 102 may be a vehicle in communication with one or more other vehicles. For example, the electronic device 102 may send information (e.g., pose information, object location information, object position information, object orientation information, camera pose information, vehicle pose information, mapping information, journey information, object detection information, raw image information, etc.) to one or more vehicles and/or may receive information from one or more vehicles (e.g., may share information). In some approaches, the electronic device 102 may produce and/or receive pose information (e.g., mapping information), which may be shared with one or more other vehicles.

In some configurations, the electronic device 102 may be a network device (e.g., server, cloud device, etc.) that communicates with one or more vehicles. In some approaches, one or more of the vehicles may be an autonomous vehicle, a self-driving vehicle, and/or may have an Advanced Driver Assistance System (ADAS), etc. For example, the electronic device 102 may receive information (e.g., VIO information, GPS information, journey information, object detection information, raw image information, etc.) from one or more vehicles. The electronic device 102 may determine pose information (e.g., 3D pose information, 3D mapping information, refined object location information, etc.), which the electronic device 102 may provide to one or more vehicles.

In some configurations, the electronic device 102 may include a processor 112, a memory 126, one or more displays 132, one or more image sensors 104, one or more optical systems 106, one or more communication interfaces 108, one or more inertial sensors 114, and/or one or more global positioning receivers 122 (e.g., GPS receiver(s), Global Navigation Satellite System (GNSS) receiver(s), etc.). The processor 112 may be coupled to (e.g., in electronic communication with) the memory 126, display(s) 132, image sensor(s) 104, optical system(s) 106, communication interface(s) 108, inertial sensor(s) 114, and/or global positioning receivers 122. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

In some configurations, the electronic device 102 may perform one or more of the functions, procedures, methods, steps, etc., described in connection with one or more of FIGS. 1-9. Additionally or alternatively, the electronic device 102 may include one or more of the structures described in connection with one or more of FIGS. 1-9.

The communication interface(s) 108 may enable the electronic device 102 to communicate with one or more other electronic devices (e.g., network devices, servers, computers, vehicles, smart phones, tablet devices, etc.). For example, the communication interface(s) 108 may provide an interface for wired and/or wireless communications. In some configurations, the communication interface(s) 108 may be coupled to one or more antennas 110 for transmitting and/or receiving radio frequency (RF) signals. Additionally or alternatively, the communication interface(s) 108 may enable one or more kinds of wireline (e.g., Universal Serial Bus (USB), Ethernet, etc.) communication.

In some configurations, multiple communication interfaces 108 may be implemented and/or utilized. For example, one communication interface may be a cellular (e.g., 3G, Long Term Evolution (LTE), CDMA, etc.) communication interface, another communication interface may be an Ethernet interface, another communication interface may be a universal serial bus (USB) interface, and yet another communication interface may be a wireless local area network (WLAN) interface (e.g., Institute of Electrical and Electronics Engineers (IEEE) 802.11 interface). In some configurations, the communication interface(s) 108 may send information (e.g., pose information, image information, location information, object detection information, map information, etc.) to and/or receive information from another electronic device (e.g., a vehicle, a smart phone, a camera, a display, a remote server, etc.).

In some configurations, the electronic device 102 may obtain one or more images (e.g., digital images, image frames, video, etc.). For example, the electronic device 102 may include the image sensor(s) 104 and the optical system(s) 106 (e.g., lenses) that focus images of scene(s) and/or object(s) that are located within the field of view of the optical system onto the image sensor 104. The optical system(s) 106 may be coupled to and/or controlled by the processor 112.

A camera (e.g., a visual spectrum camera or otherwise) may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, wide-angle images, etc.). In some implementations, the electronic device 102 may include a single image sensor 104 and/or a single optical system 106. For example, a single camera with a particular resolution (e.g., video graphics array (VGA) resolution, 1280×800 pixels, etc.), at a particular frame rate (e.g., 30 frames per second (fps), 60 fps, 120 fps, etc.) may be utilized. In other implementations, the electronic device 102 may include multiple optical system(s) 106 and/or multiple image sensors 104. For example, the electronic device 102 may include two or more lenses in some configurations. The lenses may have the same focal length or different focal lengths.

Additionally or alternatively, the electronic device 102 may request and/or receive the one or more images from another electronic device or device (e.g., vehicle camera(s), one or more external cameras coupled to the electronic device 102, a network server, traffic camera(s), etc.). In some configurations, the electronic device 102 may request and/or receive the one or more images via the communication interface 108. For example, the electronic device 102 may or may not include camera(s) (e.g., image sensor(s) 104 and/or optical system(s) 106) and may receive images from one or more remote devices (e.g., vehicles).

One or more of the images (e.g., image frames) may include one or more scene(s) and/or one or more object(s). In some cases, the image(s) may include one or more objects (e.g., landmarks, road signs, lane markers, traffic lights, construction zone cones, barriers, light poles, road markings, trees, landscapes, stationary objects, etc.).

In some examples, the image sensor(s) 104 and/or the optical system(s) 106 may be mechanically coupled to the electronic device 102 or to a remote electronic device (e.g., may be attached to, mounted on, and/or integrated into the body of a vehicle, the hood of a car, a rear-view mirror mount, a side-view mirror, a bumper, etc., and/or may be integrated into a smart phone or another device, etc.). The image sensor(s) 104 and/or optical system(s) 106 may be linked to the electronic device 102 via a wired and/or wireless link. For example, the image sensor(s) 104 and/or optical system(s) 106 may be hardwired to a control mechanism (e.g., processor 112) in a vehicle or information captured by the image sensor(s) 104 and/or optical system(s) 106 may be wirelessly transmitted (e.g., streamed or otherwise wirelessly transported) to the control mechanism (e.g., processor 112).

In some configurations, the image sensor(s) 104 (e.g., camera(s)) and inertial sensor(s) 114 (e.g., IMU) may be mounted on the same rigid frame (e.g., rigid mounting frame, rigid vehicle frame, etc.), and rigidly with respect to a GPS antenna (e.g., one or more antennas of the one or more antennas 110 described in connection with FIG. 1). In some implementations where multiple cameras are used, additional camera(s) may be mounted in a rigid manner with respect to a primary camera (e.g., main computer vision (CV) camera).

In some approaches, an approximate estimate for the coordinates of the origin of the image sensor 104 (e.g., camera) reference frame in the inertial sensor 114 (e.g., accelerometer) reference frame may be predetermined (e.g., from offline measurements, tape measurements, etc.). An approximate estimate for a rotation matrix that transforms points in the image sensor 104 (e.g., camera) reference frame to the inertial sensor 114 (e.g., accelerometer) reference frame may be predetermined. In some implementations, image frames (e.g., CV camera(s) frames) and inertial sensor 114 (e.g., IMU) measurements may be timestamped with a common clock with a degree of accuracy (e.g., an accuracy of within 100 microseconds ($\alpha$s)).

In some approaches, the image sensor 104 (e.g., camera) height, pitch, and/or roll angle may be determined offline using a calibration procedure. For example, a vehicle may be stationary during calibration and/or initialization of VIO. Additionally or alternatively, a vector between the camera center and the global positioning receiver 122 (e.g., GPS/GNSS receiver and/or the GPS antenna) may be determined in the image sensor 104 (e.g., camera) frame of reference. For example, a vector between the image sensor 104 (e.g., camera) center and a GPS antenna may be measured (e.g., measured offline) and accounted for (during runtime, for example).

In some configurations, one or more sensors (e.g., front end sensors, camera(s), image sensor(s) 104, IMU, inertial sensor(s) 114, and/or global positioning receiver 122, etc.) may be consumer grade sensors. In some approaches, the image sensor(s) 104, inertial sensor(s) 114, and/or global positioning receiver 122 may send their input into a sensor synchronization ("sync") board (not shown) before it is sent to the processor 112. For example, the electronic device 102 may include a sensor sync board in some configurations. The sensor synchronization board may include an embedded micro controller. In some approaches, the sensor synchronization board may control time stamps of all sensors. The timing error of the time stamps may be less than a specified amount (e.g., less than 10 microsecond (μs) timing error).

One function of the sensor sync board may be to record the timestamps of all sensors (e.g., all sensors involved in positioning and/or mapping), using the same internal system clock (with a specified error, such as <10 μs). Consistency may be maintained even if the global positioning (e.g., GPS) receiver 122 is not synchronized to GPS time.

The sensor sync board may perform one or more of the following functionalities. The sensor sync board may receive synchronization signals (e.g., one pulse per frame exposure) from one or more (e.g., four) cameras and time-tag the synchronization signals in system clock units. Alternatively (or simultaneously, for example), the sensor sync board may generate camera trigger signals at a predetermined update rate. In some configurations, the sensor sync board may periodically initiate a reading sequence onto the inertial sensor(s) 114 (e.g., IMU sensor(s)). The sensor sync board may time tag the inertial sensor(s) 114 (e.g., IMU) data. In some configurations, the sensor sync board may manage (e.g., may manage configuration, fix rate, and/or binary message output list, etc.) the global positioning receiver 122 (e.g., built-in GPS receiver). The sensor sync board may collect raw data and position, time, and/or velocity from the global positioning receiver 122. The sensor sync board may receive and time-tag a GPS-generated one pulse per second (1PPS) signal.

It should be noted that the sensor sync board may be designed to have the capability of being daisy chained to other similar boards, providing global synchronization capability across the electronic device 102 (e.g., vehicle). For example, one board may be the master, and may synchronize all other boards onto its own internal clock.

In some configurations (for compactness, for example), the sensor sync board may physically incorporate both the global positioning (e.g., GPS) receiver 122 and the inertial sensor(s) 114 (e.g., IMU sensors). For instance, the sensor sync board may include MEMS inertial sensors (including gyroscope and accelerometer) and a GPS/GNSS receiver. In some configurations, the sensor sync board may work with the image sensor(s) 104 (e.g., camera sensor(s)). For example, a mono camera may be utilized in some implementations, which has rolling shutter and HDR capability for automotive use cases. Further, the camera may provide a synchronization signal that marks the starting point of a frame.

One challenge for tight sensor fusion is to obtain accurate time stamps over multiple sensors (e.g., GPS/GNSS, vision, IMU, etc.). Even millisecond-order differences may affect accuracy. In some configurations, the sensor sync board may trigger image sensor 104 (e.g., camera) capture and/or read a timestamp from an image sensor 104 (e.g., camera). As described above, some examples of the sensor sync board may include an embedded IMU and/or may trigger IMU reading with an accurate timestamp. Additionally or alternatively, some examples of the sensor sync board may include embedded GPS/GNSS. Timestamp accuracy may be targeted on the order of microseconds (e.g., <10 microseconds μs).

The memory 126 may store instructions and/or data. The processor 112 may access (e.g., read from and/or write to) the memory 126. For instance, the memory 126 may store images, inertial information, global positioning information, and/or instruction codes for performing operations by the processor 112. Examples of instructions and/or data that may be stored by the memory 126 may include pose information 128 (e.g., camera pose information, vehicle pose information, and/or electronic device 102 pose information, etc.), information from the inertial sensor(s) 114, information from the global positioning receiver 122, inertial information, acceleration information, velocity information, orientation information, gyro information, global positioning information (e.g., GPS measurements), global positioning velocity information, error metric information, image information, object detection information, object location information, 2D object location information (e.g., pixel data), feature points, key points, corners, object mapping information, and/or 3D object location information, etc., image obtainer instructions, inertial sensor 114 instructions, global positioning receiver 122 instructions, perception module 116 instructions, positioning module 118 instructions, VIO module 120 instructions, and/or instructions for one or more other elements, etc.

In some configurations, the electronic device 102 may include an image data buffer (not shown). The image data buffer may buffer (e.g., store) image information from the image sensor(s) 104 and/or external camera(s). The buffered image information may be provided to the processor 112.

In some configurations, the electronic device 102 may include one or more displays 132. In some approaches, images (e.g., scenes and/or objects) that are being captured by the image sensor(s) 104 may be presented on the display 132. For example, one or more images from the camera(s) mounted on a vehicle may be sent to the display(s) 132 in a dashboard for viewing by a user. In some configurations, these images may be played back from the memory 126, which may include image information of an earlier captured scene. The one or more images obtained by the electronic device 102 may be one or more video frames and/or one or more still images. For example, the display(s) 132 may be configured to output a view of one or more objects (e.g., signs, lane markers, landmarks, etc.).

The display(s) 132 may be integrated into the electronic device 102 and/or may be coupled to the electronic device 102. For example, the electronic device 102 may be a virtual reality headset with integrated displays 132. In another example, the electronic device 102 may be a computer that is coupled to a virtual reality headset with the displays 132. In yet other examples, the electronic device 102 may be a vehicle or may be included in (e.g., integrated into) a vehicle.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein may be presented on the display 132 and/or user interface 134. In some configurations, the user interface 134 may enable a user to indicate preferences (e.g., view settings) and/or interact with the view. For example, the user interface 134 may receive one or more commands for starting a navigation application on the electronic device 102 that uses global positioning information (e.g., GPS and/or GNSS data) in a VIO system.

In some configurations, the electronic device 102 (e.g., processor 112) may optionally be coupled to, be part of (e.g., be integrated into), include, and/or implement one or more kinds of devices. For example, the electronic device 102 may be implemented in a vehicle equipped with one or more cameras. In another example, the electronic device 102 may be implemented in a drone equipped with one or more cameras. In other examples, the electronic device 102 (e.g., processor 112) may be implemented in a server or a smart phone.

The electronic device 102 may include one or more inertial sensors 114. The inertial sensor(s) 114 may provide inertial information (e.g., acceleration information and/or orientation information). For example, the inertial sensor(s) 114 may detect (e.g., sense) motion (e.g., acceleration) and/or orientation. In some configurations, the inertial sensor(s) 114 may include one or more accelerometers and/or one or more gyroscopes. The accelerometer(s) may detect acceleration in one or more directions (e.g., along one or more axes). The gyroscope(s) may detect orientation. For example, the gyroscope(s) may determine roll, pitch, and/or yaw values. In some implementations, the inertial sensor(s) 114 may provide three-dimensional (3D) accelerometer information and 3D gyroscope information at a particular frequency (e.g., 200 hertz (Hz)). In some configurations, the inertial sensor(s) 114 may be an inertial measurement unit (IMU).

The inertial sensor(s) 114 may be subject to one or more biases, scale factor offsets, and/or non-orthogonality of the 3D coordinate axes. Bias and scale factors may be additive and multiplicative variables (e.g., unknowns) respectively applied on the measurements to obtain true measurements. For example, an accelerometer may provide a measurement of acceleration. A bias may be added to or subtracted from the acceleration measurement and/or a scale factor may be multiplied with the acceleration measurement in order to obtain true acceleration (or more accurate acceleration measurement). Furthermore, the non-orthogonality (e.g., IMU non-orthogonality) of the 3D coordinate axes may be modeled as multiplicative cross-coupling of measurements along the three axes. Additionally or alternatively, the inertial sensor(s) 114 may be subject to a misalignment between the inertial sensor(s) 114 and the image sensor(s) 104 (e.g., IMU and camera). For example, the misalignment may be a translational and/or rotational displacement between the inertial sensor(s) and the image sensor(s) 104 (e.g., camera). Bias, scale, non-orthogonality, and/or misalignment may be included in the Kalman filter (e.g., EKF) state. For example, the Kalman filter may estimate and/or refine the bias, scale, non-orthogonality, and/or misalignment when updating.

In some configurations, the electronic device 102 (e.g., VIO module 120) may obtain a bias estimate, a scale estimate, non-orthogonality estimate, and/or a misalignment estimate. For example, the bias estimate, scale estimate, non-orthogonality estimate, and/or misalignment estimate may be part of the extended Kalman filter state and may be estimated as a part of filter prediction and update functions.

The electronic device 102 may include a global positioning receiver 122. The global positioning receiver 122 may determine global positioning information (e.g., GPS data, GNSS data, GPS velocity, etc.). For example, the global positioning receiver 122 may receive one or more signals from one or more satellites that enable the global positioning receiver 122 to determine (e.g., estimate) a position of a receiving antenna (e.g., GPS antenna). In some implementations, satellites may include a system of transmitters positioned to enable entities to determine their location on or above the Earth based, at least in part, on signals received from the transmitters. For example, a transmitter may transmit a signal marked with a repeating pseudo-random noise (PN) code of a set number of chips and may be located on ground-based control stations, user equipment, and/or space vehicles. In a particular example, transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for a satellite positioning system (SPS). For example, the techniques provided herein may be applied to or otherwise be enabled for use in various regional systems and/or various augmentation systems (e.g., a Satellite Based Augmentation System (SBAS)) that may be associated with or otherwise be enabled for use with one or more global and/or regional navigation satellite systems.

The global positioning receiver 122 may determine global positioning information. The global positioning information may include one or more kinds of information. For example, the global positioning information may indicate a position (relative to the Earth) of a GPS antenna. In some configurations, the global positioning information may include a GPS velocity (e.g., a GPS velocity relative to Earth). The GPS velocity may indicate a speed and/or heading of an antenna (e.g., GPS antenna coupled to the global positioning receiver 122). In some configurations, the global positioning information may include an error metric. The error metric may indicate a degree of certainty (or uncertainty) in the GPS velocity. The global positioning information may be determined and/or provided at a particular rate. For example, the global positioning information may be determined and/or provided at 1 hertz (Hz), 5 Hz, 10 Hz, etc.

The processor 112 may be configured to implement one or more of the methods disclosed herein. For example, the processor 112 may be configured to use global positioning information (e.g., GPS data, GNSS data, GPS velocity, etc.) with VIO.

The processor 112 may include and/or implement an image obtainer in some configurations. One or more image frames may be provided to the image obtainer. For example, the image obtainer may obtain images from one or more cameras (e.g., normal cameras, wide-angle cameras, fisheye cameras, stereoscopic cameras, etc.). For example, the image obtainer may receive image information from one or more image sensors 104, from one or more external cameras, and/or from one or more remote cameras (e.g., remote vehicle cameras). The images may be captured from one or multiple cameras (at different locations, for example). As described above, the image(s) may be captured from the image sensor(s) 104 included in the electronic device 102 or may be captured from one or more remote camera(s).

In some configurations, the image obtainer may request and/or receive one or more images. For example, the image obtainer may request and/or receive one or more images from a remote device (e.g., external camera(s), remote server(s), remote electronic device(s), remote vehicle(s), etc.) via the communication interface 108.

In some configurations, the processor 112 may include a perception module 116 and/or a positioning module 118. The output (e.g., one or more frames) of the image sensor(s) 104 (e.g., camera), inertial sensor(s) 114 (e.g., IMU), and/or global positioning receiver 122 (e.g., GPS) may be provided to the perception module 116 and/or the positioning module 118.

The perception module 116 may detect one or more objects based on one or more images (e.g., image information, image frames, video, etc.). For example, the perception module 116 may detect one or more landmarks in an incoming video stream. The perception module 116 may locate (e.g., localize) the object(s) in the images. The perception module 116 may provide perception information. For example, the perception information may include object (e.g., landmark) detection information (e.g., object features, object keypoints, object type, etc.), object location information, object pose information, etc.

In some implementations, the perception module 116 may detect and/or locate landmarks such as signs and lane markers. For example, the perception module 116 may include sign and lane marker modules to detect signs and lanes in image frames as landmarks. In some configurations, the sign module may perform detection, tracking, and fitting (e.g., fitting data to a model, such as a sign shape). Additionally or alternatively, the lane marker module may perform lane marker detection and spatio-temporal analysis (e.g., tracking across multiple frames).

The positioning module 118 may determine pose information (e.g., camera pose information, electronic device 102 pose information, vehicle pose information, etc.). For example, the positioning module 118 may determine pose information based on visual, inertial, and global positioning information (e.g., by integrating visual, inertial, and GPS/GNSS inputs). For instance, the image sensor(s) 104 (and/or image obtainer, for example) may provide image information to the positioning module 118, the inertial sensor(s) 114 may provide inertial information to the positioning module 118, and/or the global positioning receiver 122 may provide global positioning information to the positioning module 118. The pose information may indicate a location and/or orientation. For example, the pose information may indicate a location and/or orientation of a camera, of the electronic device 102, of a vehicle, etc. In some configurations, the pose information may be relative to the Earth (e.g., in Earth coordinates, World Geodetic System 1984 (WGS84) coordinates, Earth-centered Earth-fixed (ECEF) coordinates, east north up (ENU) coordinates, etc.).

In some configurations, the positioning module 118 may include a visual inertial odometry (VIO) module 120. The VIO module 120 may determine pose information based on VIO. For example, the VIO module 120 may utilize perception information (e.g., object features, object location information, etc.), image information, inertial information, and/or global positioning information to determine pose information. For example, the positioning module 118 may provide estimates of camera poses (in 6 DOF, for example) by fusing GPS information (e.g., from the global positioning receiver 122), inertial sensor 114 inputs and image sensor 104 (e.g., camera video) inputs.

In some configurations, the VIO module 120 may determine a predicted velocity relative to Earth based on image information and inertial information. For example, the VIO module 120 may determine a predicted velocity relative to Earth using a camera and an IMU. In some approaches, the predicted velocity may correspond to an epoch. An epoch may be a measure of time. For example, the VIO module 120 may determine a first predicted velocity corresponding to a first epoch and a second predicted velocity corresponding to a second epoch. In some approaches, each epoch may relate to global positioning measurements. For example, different global positioning measurements may correspond to different epochs.

As described herein, the global positioning receiver 122 may determine and/or provide a GPS velocity relative to Earth in some configurations. Some scenarios may be challenging for VIO. For example, freeway driving may be a challenging scenario for VIO, where a lack of good nearby features may result in less robust results. Additionally or alternatively, outliers like vehicles moving in the view of the camera may lead to less robust results. Additionally or alternatively, a near constant velocity may cause accelerations (e.g., acceleration measurements) to be buried in noise (e.g., measurement noise). This may lead to a loss of absolute scale (e.g., a loss of true or accurate scale). A lack of sense of absolute yaw (e.g., true or accurate yaw) may lead to an unbounded drift in yaw. GPS velocity aiding may be utilized to address many VIO challenges (e.g., freeway challenges). For example, clear skies often accompany freeway driving, which may provide an error in GPS velocity of 0.5 meters per second (m/s) in each axis. GPS velocity may provide an independent measure of absolute scale and/or a measure of absolute heading (e.g., yaw). For instance, VIO may lose a sense of scale, which may be bounded and/or corrected with GPS measurements as described above.

In some approaches, the GPS velocity may be integrated into VIO in order to aid VIO (e.g., reduce drift, refine bias, refine scale, refine non-orthogonality, and/or refine misalignment, etc.). In some approaches, a GPS velocity may be utilized in accordance with Equation (1).

$$y_{vel}=R_{ns}V_{sb} \qquad (1)$$

In Equation (1), $y_{vel}$ is a GPS velocity, $R_{ns}$ is a rotation matrix (e.g., a 3×3 matrix), and $V_{sb}$ is the velocity of the body b (e.g., electronic device 102, vehicle, rover, etc.) represented in the spatial frame. The rotation matrix $R_{ns}$ may relate the GPS velocity and the spatial frame velocity. In some approaches, the rotation matrix $R_{ns}$ may be determined (e.g., initially determined) during calibration (e.g., during a 1-time calibration). An example of determining a rotation matrix is given in connection with FIG. 8.

In some configurations, $R_{ns}$ may be calculated as follows. If there is enough movement (e.g., if the electronic device 102, vehicle, rover, etc., is moving sufficiently fast), the VIO module 120 may calculate $V_{sb}$ and the global positioning receiver 122 may calculate $V_n$, where $V_n$ is the body velocity represented in the 'N' frame. The N frame is the east north up (ENU) earth-fixed frame in which the GPS velocity is measured. If the vectors are not collinear, then $R_{ns}$ may be calculated in accordance with Equation (2).

$$R_{ns}=\exp[e\theta_x] \qquad (2)$$

In Equation (2), $e=V_{sb}\times V_n$, $\theta=\angle V_{sb},V_n$ (where $\angle$ denotes the angle between vectors), and × denotes a skew-symmetric matrix. For example, $\forall u=[u_1, u_2, u_3]^T \in R^3$, a skew-symmetric matrix is $$[u_\times] = \begin{bmatrix} 0 & -u_3 & u_2 \\ u_3 & 0 & -u_1 \\ -u_2 & u_1 & 0 \end{bmatrix}.$$

The estimate of the rotation matrix may not be well-defined when the vectors are collinear (e.g., perfect alignment of VIO spatial frame with the GPS global reference frame, which is highly unlikely).

In some approaches, the global positioning receiver 122 may provide an error metric. For example, the error metric may be a speed error metric, which may be denoted $\sigma_s$. In particular, $\sigma_s$ may denote the standard deviation of the speed error estimate.

The global positioning information may be integrated in two forms. For example, the global positioning information may be integrated as a three-dimensional (3D) velocity and/or as speed. In some approaches, the 3D velocity may be determined (e.g., calculated) in accordance with Equation (3).

$$P=\sigma_s^2 I \qquad (3)$$

In Equation (3), P may be the 3D velocity (e.g., a 3×3 matrix) and I is the identity matrix. Equation (3) may utilize the final covariance matrix used for the measurement. In some approaches, determining the 3D velocity may require calculation of $R_{ns}$. Yaw may not drift with 3D velocity. For example, the GPS velocity may provide a direct estimate of velocity in the ENU frame, which may force a velocity or heading, which may provide a correction of the yaw.

In some approaches, speed may be determined (e.g., calculated) in accordance with Equation (4).

$$y_{vel}^T y_{vel} \qquad (4)$$

In Equation (4), $y_{vel}$ denotes a velocity measurement and T denotes a matrix transpose. For example, Equation (4) may provide a speed measurement of the GPS. Kalman filter notation may utilize x to denote state and y to denote measurement. In some approaches, determining the speed may not require calibration for $R_{ns}$. It should be noted that heading information may be lost (with speed calculation, for example), which may lead to yaw drift.

In some configurations, operation may start with speed aiding (without heading, for example) and may proceed to 3D velocity aiding. For example, the positioning module 118 may initially use speed to determine pose information. Once a certain speed is reached (e.g., 10 meters per second (m/s)), $R_{ns}$ may be determined, which may be utilized to determine pose information. An example is given in connection with FIG. 8.

The VIO module 120 may determine a difference vector between the predicted velocity and the GPS velocity. In some approaches, the difference vector may be referred to as an innovation vector.

The VIO module 120 may refine a bias estimate and a scale factor estimate of inertial sensor 114 information (e.g., inertial information, IMU measurements, etc.). For example, the VIO module 120 may refine the bias estimate and/or the scale factor estimate proportional to the difference vector. Additionally or alternatively, the VIO module 120 may refine a misalignment estimate between the image sensor(s) 104 (e.g., camera) and the inertial sensor(s) 114 (e.g., IMU) based on (e.g., proportional to) the difference vector. Additionally or alternatively, the VIO module 120 may refine a non-orthogonality estimate.

In some approaches, updating the Kalman filter (e.g., EKF) using the GPS velocity may refine the bias estimate, the scale factor estimate, the non-orthogonality estimate, and/or the misalignment estimate. For example, the VIO module 120 (e.g., EKF) may have a state. The state may include position, velocity, orientation, one or more calibration factors, bias, scale, non-orthogonality, and/or misalignment. In some cases (e.g., when motion insufficiently excites sensors, such as in the highway automotive case), bias, scale, non-orthogonality, and/or misalignment may not converge. Accordingly, a GPS velocity measurement may be utilized as an update to the Kalman filter (e.g., EKF) in order to determine a better estimate of scale, bias, non-orthogonality, and/or misalignment. For example, the Kalman filter may estimate (e.g., predict) position or velocity (e.g., estimate an anticipated measurement). With the current measurement of position or velocity, the Kalman filter may obtain an error vector, which may be multiplied by a gain. In particular, the Kalman filter predicts a state (e.g., predicts a measurement). From the predicted state (e.g., position or velocity estimate) and the measurement (e.g., measured position or velocity), the Kalman filter may determine an error vector and then update the state in order to reduce the error vector. Because the state includes bias, scale, non-orthogonality, and misalignment, updating the Kalman filter may provide refinements for bias, scale, non-orthogonality, and misalignment. For example, refining the bias estimate, the scale factor estimate, the non-orthogonality estimate, and/or the misalignment estimate may be accomplished via the velocity measurement update in the EKF, following the update procedure for the EKF. The innovation (error) computed from the velocity measurement may impact these states as a result of the correlations, which are captured in the EKF covariance matrix.

In some approaches, the electronic device 102 (e.g., positioning module 118, VIO module 120, etc.) may obtain an error metric (e.g., quality metric) indicating an uncertainty in the GPS velocity. For example, the global positioning receiver 122 may determine and provide the error metric. As part of the computation of the velocity estimate by the GPS receiver, for instance, the error metric may be output from the accumulation of the noise (sources) in the algorithm implementation. The electronic device 102 (e.g., positioning module 118, VIO module 120, etc.) may weight the GPS velocity in a Kalman filter based on the error metric. For example, the error metric (e.g., uncertainty) may have an inverse relation to the weight. Accordingly, higher uncertainties may correspond to lower weights, whereas lower uncertainties (e.g., higher certainty, higher quality, etc.) may correspond to higher weights. The weighted GPS velocity may be utilized in a Kalman filter update.

In accordance with some configurations of the systems and methods disclosed herein, the predicted velocity error may be bounded based on the GPS velocity. Additionally or alternatively, the GPS velocity may be utilized to reduce VIO drift.

The VIO module 120 may determine and/or provide pose information (e.g., pose information 128) based on one or more refined parameters. For example, the VIO module 120 may determine and/or provide the pose information based on the refined bias estimate, the refined scale estimate, refined non-orthogonality estimate, and/or the refined misalignment estimate. Pose information may include position and/or orientation information.

In some configurations, the electronic device 102 may control a vehicle based on the pose information. For example, the pose information (based on one or more refined parameters) may indicate a position of a vehicle relative to coordinate system and/or map. The electronic device 102 may control the vehicle position based on the pose information by controlling the vehicle to track a route to a destination in the coordinates and/or map, for example. Controlling a vehicle with the pose information (that is based on the refined parameter(s)) may be beneficial by providing an improvement in positional information. Refining the parameter(s) may additionally or alternatively be beneficial by enabling the use of less costly equipment for navigation.

In some configurations, the outputs of the perception module 116 and the positioning module 118 may be aggregated and sent to a mapping algorithm in the cloud, which may generate a location estimate of one or more landmarks in a global frame. For example, one or more mapping algorithms in the cloud (e.g., on one or more network devices, remote servers, etc.) may detect and/or localize landmarks to generate a localization map.

In some configurations, one or more of the following frames (e.g., coordinate systems) may be defined and/or utilized. A global frame may be denoted as "e" in some approaches. For example, the global frame e may be ECEF in WGS84. A local frame (or VIO spatial frame) may be denoted as "s" in some approaches. For example, the local frame s may be an Earth-fixed frame with arbitrary origin (in translation, for example) and orientation. One or more body frames may be defined and/or utilized in some approaches. One example is a vehicle body frame that may be denoted "a(t)". For instance, the vehicle body frame a(t) may be fixed to a vehicle, with an origin at an antenna center of phase, oriented along the vehicle with x-right, y-forward, and z-up. Another example is a camera frame that may be denoted "c(t)". For instance, the camera frame c(t) may be fixed to a vehicle, with an origin at camera center, while facing forward, oriented with x-right, y-down, and z-forward. Another example is an accelerometer frame that may be denoted "b(t)". For instance, the accelerometer frame b(t) may be fixed to the accelerator in an IMU sensor embedded in a sensor sync board. Another example is a gyroscope frame that may be denoted "g(t)". For instance, the gyroscope frame g(t) may be fixed to the gyroscope in an IMU sensor embedded in a sensor sync board. A ground truth GPS related frame (e.g., GT GPS IMU frame) may be defined and/or utilized in some configurations. It should be noted that one or more other frames and/or coordinate system definitions may be used in addition to or alternatively from one or more of the foregoing frames described.

It should be noted that one or more of the elements or components of the electronic device 102 may be combined and/or divided. For example, the perception module 116, the positioning module 118, and/or the VIO module 120 may be combined. Additionally or alternatively, the perception module 116, the positioning module 118, and/or the VIO module 120 may be divided into elements or components that perform a subset of the operations thereof.

It should be noted that one or more of the elements or components described in connection with the processor 112 may be optional. For example, the electronic device 102 may or may not include and/or may or may not implement the image sensor(s) 104, optical system(s) 106, communication interface(s) 108, the inertial sensor(s) 114, the global positioning receiver 122, the perception module 116, the positioning module 118, and/or the VIO module 120 in some configurations. In some implementations, the perception module 116, the positioning module 118, and/or the VIO module 120 may be implemented as independent circuitry (not as part of a processor 112, for example). In some configurations, a group of electronic devices (e.g., a drone swarm, group of vehicles, etc.) may coordinate. For example, one or more electronic devices 102 may provide (e.g., send, transmit, etc.) data (e.g., image data, inertial data, global positioning data, etc.) to another electronic device (e.g., server, vehicle, etc.) that may determine pose information.

Figure 2:
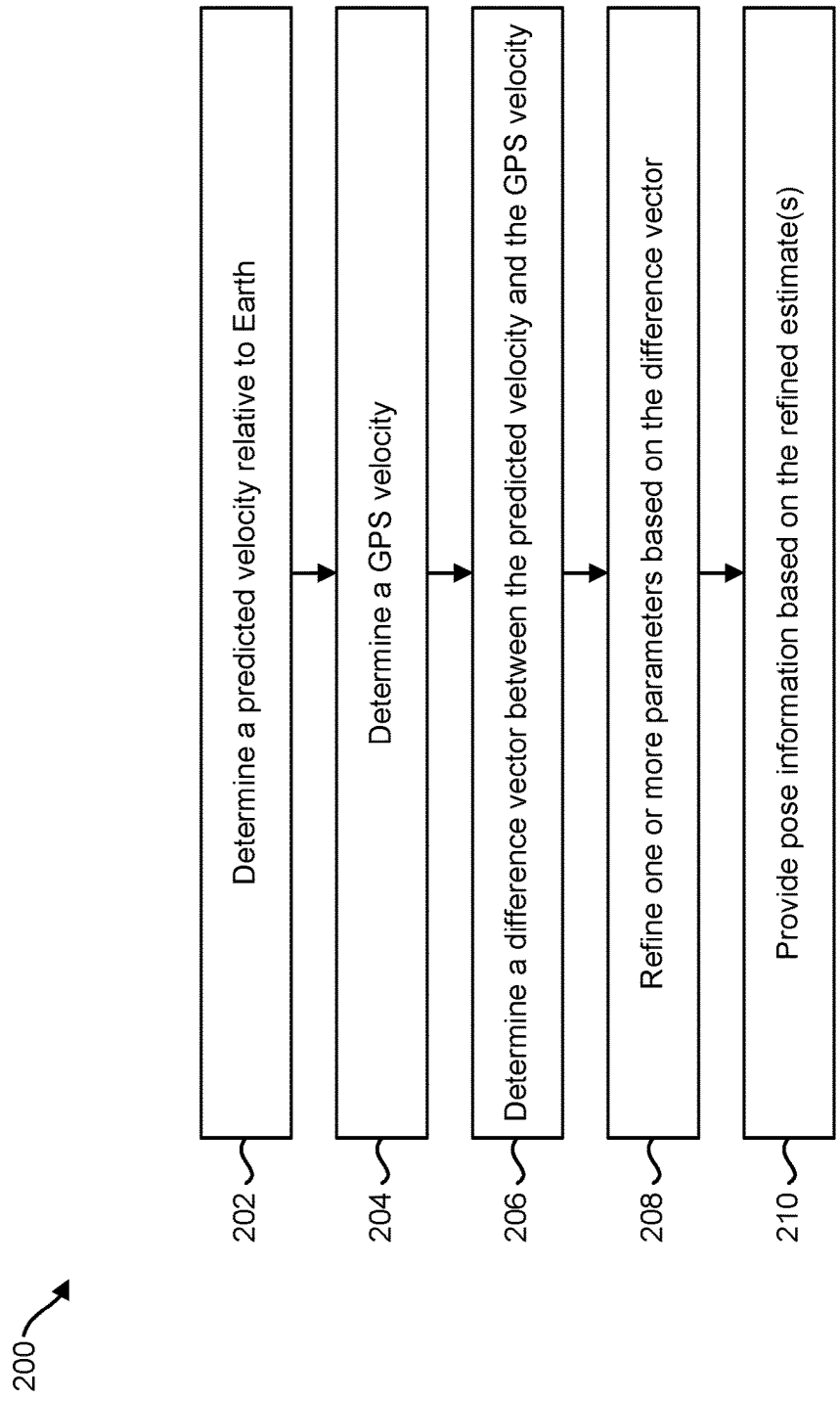
FIG. 2 is a flow diagram illustrating one configuration of a method for using GPS velocity in VIO.

FIG. 2 is a flow diagram illustrating one configuration of a method 200 for using GPS velocity in VIO. The method 200 may be performed by the electronic device 102 described in connection with FIG. 1. The electronic device 102 may determine 202 a predicted velocity relative to Earth. This may be accomplished as described in connection with FIG. 1. For example, the electronic device 102 (e.g., VIO module 120) may utilize visual information (e.g., observed object positions, feature points, and/or perception information over two or more frames) and/or inertial information (e.g., accelerometer information) to predict the velocity of the camera (e.g., the image sensor(s) 104 or a remote camera) relative to Earth. For instance, the electronic device 102 may determine the predicted velocity using a camera and an IMU. In some approaches, the predicted velocity may correspond to an epoch (e.g., a time, a time period, etc.).

The electronic device 102 may determine 204 a GPS velocity. The GPS velocity may be relative to Earth. This may be accomplished as described in connection with FIG. 1. For example, the electronic device 102 may obtain a measure of GPS velocity from a global positioning receiver.

In some configurations, the electronic device 102 may include a global positioning receiver, where the global positioning receiver determines position (e.g., antenna position) and/or GPS velocity. For example, The GPS velocity may be computed by a global positioning receiver (e.g., GPS/GNSS receiver). In some implementations, the global positioning receiver may be a real-time GNSS receiver implementation in open-source code. In some approaches, the GPS velocity may be determined from Doppler measurements in the global positioning receiver. In some configurations, the global positioning receiver may determine the GPS velocity at a particular rate (e.g., a rate of 5 Hz that is greater than a 1 Hz rate).

The GPS velocity may indicate a speed and/or a direction of the electronic device 102. In some configurations, the electronic device 102 may also determine an error metric (e.g., quality metric) associated with the GPS velocity. The error metric may represent uncertainty of the GPS velocity vector along each of one or more axes (e.g., orthogonal axes). For example, the global positioning receiver 122 may determine and/or provide the error metric using satellite geometry and/or a signal-to-noise ratio (SNR) of the GPS carrier signal.

The electronic device 102 may determine 206 a difference vector between the predicted velocity and the GPS velocity (e.g., measured GPS velocity, current GPS velocity, etc.). This may be accomplished as described in connection with FIG. 1. For example, the electronic device 102 may determine a difference (e.g., subtraction) between the predicted velocity (e.g., predicted velocity vector) and the GPS velocity (e.g., GPS velocity vector).

The electronic device 102 may refine 208 one or more parameters based on the difference vector. This may be accomplished as described in connection with FIG. 1. For example, the electronic device 102 may refine a bias estimate, a scale factor estimate, a non-orthogonality estimate, and/or a misalignment estimate based on the difference vector. In some configurations, the electronic device 102 may refine the bias estimate and/or the scale factor estimate and/or the non-orthogonality estimate of inertial (e.g., IMU) measurements proportional to the difference vector. Additionally or alternatively, the electronic device 102 may refine the misalignment estimate between an image sensor (e.g., camera) and an inertial sensor (e.g., IMU) based on the difference vector (e.g., proportional to the difference vector). The misalignment estimate may include a translation displacement estimate and/or a rotation displacement estimate in some approaches. In some approaches, the bias estimate, scale factor estimate, non-orthogonality estimate, and/or misalignment estimate may be refined by updating the Kalman filter (e.g., EKF) that has bias, scale factor, non-orthogonality, and/or misalignment in the Kalman filter state.

The electronic device 102 may provide 210 pose information based on the refined estimate(s). This may be accomplished as described in connection with FIG. 1. For example, the electronic device 102 may determine pose information (e.g., camera pose information, electronic device 102 pose information, vehicle pose information, etc.) based on the refined estimate(s). In some configurations, the electronic device 102 may control a vehicle based on the pose information. Additionally or alternatively, the pose information may be stored and/or transmitted. For example, the pose information may be transmitted to a remote device (e.g., cloud device, remote server, and/or one or more vehicles). The electronic device 102 and/or a remote device may utilize the pose information in generating and/or updating (e.g., refining) a map in some approaches.

It should be noted that one or more of the functions, steps, and/or methods described herein may be repeated in some configurations. For example, the electronic device 102 may determine a second predicted velocity corresponding to a second epoch using an image sensor (e.g., camera) and/or inertial sensor (e.g., IMU). The second predicted velocity may be determined based on the refined bias estimate, the refined scale factor, the refined non-orthogonality estimate, and/or the refined misalignment estimate (or refined alignment estimate, for example).

Figure 3:
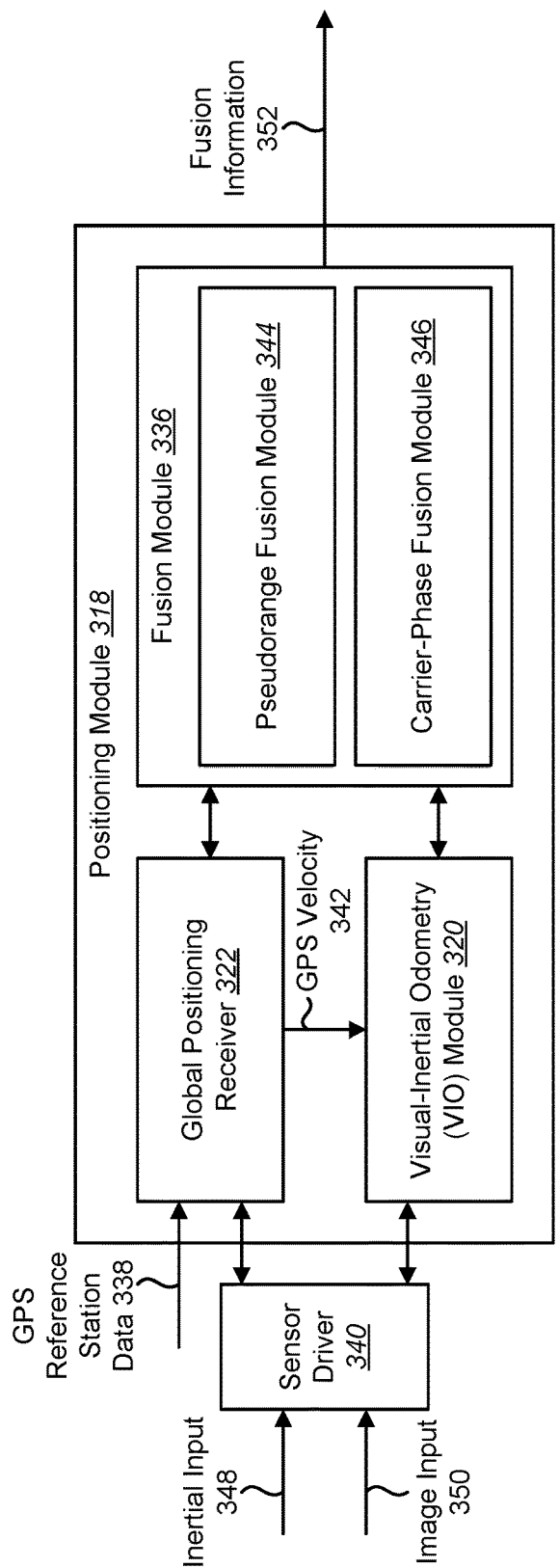
FIG. 3 is a block diagram illustrating one example of a positioning module that uses GPS velocity in VIO.

FIG. 3 is a block diagram illustrating one example of a positioning module 318 that uses a Global Positioning System (GPS) velocity in visual-inertial odometry (VIO). The positioning module 318 described in connection with FIG. 3 may be an example of the positioning module 118 described in connection with FIG. 1 in some configurations. As illustrated in FIG. 3, the positioning module 318 may include a global positioning receiver 322 (e.g., GPS/GNSS receiver), a VIO module 320, and/or a fusion module 336. It should be noted that the global positioning receiver 322 may be included in the positioning module 318 in some configurations or may be coupled to the positioning module 318 in some configurations. FIG. 3 illustrates an example of how the modules may be connected. As illustrated in FIG. 3, a sensor driver 340 may be coupled to the positioning module 318 in some configurations. The sensor driver 340 may be external to the positioning module 318 in some configurations (or may be included in the positioning module 318 in some configurations). For example, the sensor driver 340 may be implemented in the electronic device 102 described in connection with FIG. 1 in some configurations.

The sensor driver 340 may obtain an inertial input 348 and/or an image input 350. For example, the sensor driver 340 may receive measurements from one or more inertial sensors (e.g., IMU) and/or may receive a camera video input (via Universal Serial Bus (USB), for instance). The sensor driver 340 may provide image information and/or inertial information to the positioning module 318 (e.g., global positioning receiver 322 and/or VIO module 320).

It should be noted that the image information may take many forms. For example, the image information may include image data at Video Graphics Array (VGA) resolution (640×480) or Super VGA (SVGA) resolution, monochrome or color (8 bits or higher, for example), wide-angle or conventional lens, at a frame rate of 30 frames per second (fps), and/or with a timestamp in system time (e.g., time as measured at the electronic device 102). Other formats may be implemented and/or utilized.

The inertial information may include gyroscope information and/or accelerometer information (e.g., IMU information). The gyroscope and/or accelerometer may meet or exceed minimum quality requirements with respect to noise level, dynamic range etc. In some configurations, the inertial information may include one or more timestamps (in system time, for example) for gyroscope and/or accelerometer measurements. In some configurations, the sensor driver 340 may have one or more of the following capabilities: a capability to alter an inertial sensor low pass filter cutoff (e.g., cutoff frequency), a capability to access raw inertial samples, a capability to support a particular sample rate (e.g., sample rates of 200 Hz or higher), and/or a capability to provide support for temperature tables for one or more parameters (e.g., biases and/or scale factors). For example, temperature tables may be utilized to compensate for parameter variability based on temperature.

Additionally or alternatively, the sensor driver 340 may receive global positioning messages (e.g., GPS messages and timestamps) from a global positioning receiver, for example. The sensor driver 340 may provide global positioning (e.g., GNSS) measurements to the global positioning receiver 322 in some implementations. For example, the global positioning measurements may be provided at a particular update rate (e.g., 5 Hz). Additionally or alternatively, the sensor driver 340 may provide one or more other messages (e.g., a message for comparison, a message for computation of raw measurements and/or of non-smoothed measurements, and/or a message for carrier-phase GNSS fusion, etc.) to the positioning module 318.

In some configurations, the positioning module 318 may receive GPS reference station data 338. For example, the GPS reference station data 338 may include differential measurements from a reference station in a particular format. A reference station may be a ground-based station with a known position. For instance, the global positioning receiver 322 may receive Radio Technical Commission for Maritime Services (RTCM) 104 v3.0 format messages within approximately 100 kilometers (km) for pseudorange GNSS fusion and approximately 10 km for carrier-phase GNSS fusion. The RTCM messages may include 1004 (GPS observables), 1019 (GPS broadcast ephemeris), 1006 (stationary reference station address resolution protocol and antenna height), and/or 1007 (antenna descriptor). The update rate for 1004 may be 1 Hz or higher. The periodicity for 1019, 1006, and/or 1007 may be every 30 seconds or better. It should be noted that other formats and/or message types may be utilized in some configurations.

The global positioning receiver 322 may be a real-time global positioning receiver (e.g., a GNSS receiver implementation in open-source code). In some configurations, the global positioning receiver 322 may be modified. For example, the global positioning receiver 322 may parse and process messages (e.g., SiRFBinary messages) and/or may utilize differential corrections from a reference station (e.g., GPS reference station data 338 from a modem). Further modifications may be made to the global positioning receiver 322 to provide corrected global positioning (e.g., GNSS) measurements to the fusion module 336.

The global positioning receiver 322 may provide one or more outputs. For example, the global positioning receiver 322 may provide corrected global positioning (e.g., GNSS) measurements per epoch. In some configurations, the global positioning receiver 322 may provide a GPS time (in seconds and/or fraction of a second, etc., for example) and/or number of satellites. For each satellite, the global positioning receiver 322 may provide a satellite identifier, satellite valid flag, satellite position (in ECEF (1×3) coordinates, for example), pseudorange, pseudorange variance, and/or SNR. Additionally or alternatively, the global positioning receiver 322 may provide a position and/or pose (e.g., camera position, vehicle position, and/or rover position in ECEF (1×3) coordinates), GPS velocity 342 (in ECEF (1×3) coordinates, for example), and/or an error metric. One or more of the outputs may be provided to the VIO module 320 and/or to the fusion module 336. It should be noted that while the global positioning receiver 322 is illustrated as being included in the positioning module 318 in FIG. 3, the global positioning receiver 322 may alternatively not be included in the positioning module 318.

As described above, the VIO module 320 may receive image information and/or inertial information from the sensor driver 340. The VIO module 320 may receive the GPS velocity 342 (including a speed and/or a heading, for example) and/or an associated error metric (e.g., quality metric) from the global positioning receiver 322. For example, the VIO module 320 may receive a speed estimate and/or an error metric (e.g., quality metric) at each GPS epoch. In some configurations, the VIO module 320 may obtain a system clock corresponding to GPS time epochs. For example, the VIO module 320 or another module may convert GPS time to a system clock time (e.g., may convert GPS time to time as measured by the electronic device 102). Additionally or alternatively, the VIO module 320 may receive a number (e.g., N) of past GPS epochs at which VIO output is provided. For example, VIO output may be provided at times when GPS measurements are obtained. The VIO module 320 may receive a system clock time at each of the epochs (e.g., past epochs).

The VIO module 320 may produce pose information (e.g., camera pose information, electronic device 102 pose information, and/or vehicle pose information, etc.). For example, the VIO module 320 may utilize the image information, the inertial information, and/or the GPS velocity to determine the pose information.

For example, the VIO module 320 may produce one or more of the following outputs. The VIO module 320 may produce a time stamp of a camera frame, a translation (e.g., a 3×1 vector) of the camera frame with respect to a spatial frame, a velocity (e.g., a 3×1 vector) of the camera frame with respect to the spatial frame, a gravity vector (e.g., a 3×1 vector) in the spatial frame, a rotation matrix (e.g., a 3×3 matrix) of the camera frame with respect to the spatial frame, an angular velocity (e.g., a 3×1 vector) of the camera frame with respect to the spatial frame, a covariance matrix (e.g., a 3×3 matrix) of the velocity vector of the camera frame with respect to the spatial frame, a covariance matrix (e.g., a 3×3 matrix) of the translation vector of the camera frame with respect to the spatial frame, a number of past GPS time epochs for which VIO output is also output, a past time epoch (k=1, 2, . . . , N) for which VIO output is provided, a translation (e.g., a 3×1 vector) for the camera frame with respect to spatial frame at past GPS time epoch k, a covariance matrix (e.g., a 3×3 matrix) of the translation vector of the camera frame with respect to the spatial frame at past GPS time epoch k, an identifier (ID) associated with current frame, and/or an uncorrected time stamp of the current frame. In some configurations, the VIO module 320 output may be at a particular rate (e.g., 30 fps). A covariance matrix may include and/or indicate the individual variance of each of the states (e.g., poses) along diagonal terms. The off-diagonal terms may indicate covariance between the entries (e.g., states, poses, etc.). For example, the covariance matrix is a matrix that defines the error estimate of each of the variables. Each of the diagonal elements in the covariance matrix may indicate the variance of a particular element itself and the cross-diagonal elements may indicate the cross-correlation of each element with respect to another element.

In some configurations, the VIO module 320 may include an extended Kalman filter (EKF). An EKF may be a Kalman filter (e.g., a prediction and correction algorithm) that is applied to a non-linear problem or system. In some approaches, the VIO module 320 may ignore the one or more GPS velocity 342 measurements, if the error metric (e.g., quality metric) indicates that the measurement is inaccurate. For example, a GPS velocity 342 measurement may be inaccurate due to a low number of satellites, multipath, etc. In some configurations, within VIO, one or more additional mechanisms (e.g., an EKF innovation-based outlier rejection test) may be used to reject or de-weight the influence of an unreliable GPS velocity 342 measurement. For example, the electronic device 102 may reject one or more GPS velocities based on the error metric.

Some approaches of the systems and methods disclosed herein may include one or more of the following procedures. For a GPS velocity vector to be used in VIO, the GPS velocity vector may be transformed to a reference frame of the VIO (e.g., a VIO reference frame). For example, a rotational alignment (e.g., a relative rotational alignment between the VIO and global positioning reference frames) may be determined. In some configurations, this may be accomplished as described in connection with FIG. 8. The alignment may enable the use of GPS velocity in VIO.

The global positioning receiver 322 may produce (e.g., report, send, provide, etc.) the GPS velocity 342 (e.g., GPS velocity vector) in one or more frames of reference (e.g., a global positioning reference frame). For example, the global positioning receiver 322 may produce the GPS velocity vector in Earth Center Earth Fixed (ECEF) (fixed to the center of the Earth) or East North Up (ENU) (fixed on the surface of the Earth). In some configurations, the positioning module 318 may determine and/or select a frame of reference for use in constraining scale and orientation. The GPS velocity (e.g., GPS velocity vector) may be relative to the Earth.

In some configurations, the VIO module 320 may use an arbitrary fixed reference frame. For example, the reference frame for the VIO module 320 may be a spatial reference frame at time instant zero. The VIO module 320 may relate the spatial reference frame to the global positioning reference frame (e.g., a fixed frame of reference for the global positioning receiver 322). In some configurations, an initial relative misalignment determination (e.g., estimation) may be performed once (e.g., during initialization). Once the relative misalignment estimate is determined, the GPS velocity 342 (e.g., GPS velocity vector) from the global positioning receiver 322 may be used based on the relative misalignment.

A predicted velocity (e.g., predicted velocity vector) produced by the VIO module 320 and the GPS velocity 342 (e.g., GPS velocity vector) may be used to refine the relative misalignment between the global positioning reference frame (e.g., ENU or ECEF) and the spatial reference frame.

As described above, the global positioning receiver 322 may produce a GPS velocity 342 (e.g., GPS velocity vector). In some configurations, the global positioning receiver 322 may also produce an error metric (e.g., quality metric). The positioning module 318 (e.g., VIO module 320) may utilize the GPS velocity 342 and/or the error metric in one or more ways. In one example, just the GPS velocity 342 may be used with a constant error metric (e.g., static error metric and/or predetermined error metric, etc.). In a second example, the GPS velocity 342 may be used with the error metric determined by the global positioning receiver 322. In a third example, the VIO module 320 may determine a difference vector between the predicted velocity (determined by the VIO module 320, for example) and the GPS velocity 342 (e.g., the measured GPS velocity). In some approaches, one or more statistical tests (e.g., a Mahalanobis test) based on the difference vector may be performed, which may be utilized to reject spurious velocity measurements (due to multipath, for example). In a fourth example, one or more thresholding tests may be performed based on the error metric in order to reject (e.g., discard, filter, ignore, etc.) one or more velocity measurements with corresponding error metric(s) beyond a threshold. For instance, it may be more detrimental to use poor velocity measurements than to discard the poor velocity measurements, particularly if the velocity measurement rate is high enough (e.g., 5 Hz, 10 Hz, etc.). In a fifth example, the length of the GPS velocity vector may be compared to a threshold. The GPS velocity 342 may not be used if the vector length is less than the threshold. This may be useful for some global positioning receivers that have a stationary detection filter, where the velocity is artificially clamped to 0 based on stationary detection. The stationary detection filtering may cause a problem in the context of fusion, since stationary detection filtering may give rise to a jump in velocity error (when creeping up to a stop, for instance).

The fusion module 336 may receive global positioning information and/or VIO information. For example, the fusion module 336 may receive global positioning (e.g., GPS/GNSS) raw measurements (e.g., pseudorange, Doppler, and/or carrier phase) and/or visual-inertial odometry (VIO) information (e.g., from a relative positioning engine such as the VIO module 320). For instance, the fusion module 336 may receive corrected GNSS measurements from the global positioning receiver 122. The corrected GNSS measurements may include GPS time (in seconds and/or fractions of a second, etc.), and/or a number of satellites. For each satellite, the fusion module 336 may receive a satellite identifier, satellite valid flag, satellite position (in ECEF (1×3) coordinates, for example), pseudorange, pseudorange variance, and/or SNR.

Additionally or alternatively, the fusion module may receive position information (e.g., camera position, electronic device 102 position, vehicle position, rover position, and/or a 1×3 position vector in ECEF, etc.), velocity information (e.g., camera velocity, electronic device 102 velocity, vehicle velocity, rover velocity, and/or a 1×3 velocity vector in ECEF, etc.), and/or an error value (e.g., quality value). Additionally or alternatively, the VIO information may include relative measurements in a fixed, orthogonal, 3D frame of reference (the frame of reference may be arbitrary and unknown with respect to an Earth coordinate frame, for example) of a camera frame at an update rate of camera frames. For example, the VIO information may include a six degrees of freedom (6-DOF) pose, velocity, gravity, angular velocity, a camera frame identifier, GPS time (in seconds or a fraction of a second, for example) for a current pose, a translation (e.g., a 1×3 translation vector) of the camera frame with respect to a spatial frame, a velocity (e.g., a 1×3 velocity vector) of the camera frame with respect to the spatial frame, a gravity vector (e.g., a 1×3 gravity vector) in the spatial frame, a rotation matrix (e.g., a 3×3 rotation matrix) of the camera frame with respect to the spatial frame, an angular velocity (e.g., a 1×3 angular velocity vector) of the camera frame with respect to the spatial frame, a covariance matrix (e.g., a 3×3 covariance matrix) of the velocity vector of the camera frame with respect to the spatial frame, a covariance matrix (e.g., a 3×3 covariance matrix) of the translation vector of the camera frame with respect to the spatial frame, a number of past GPS time epochs for which the GPS/GNSS data is also output, a GPS time (in seconds and/or fractions of a second, for example) for a latest GPS epoch, a translation (e.g., a 1×6 translation vector) for the camera frame with respect to the spatial frame at a past GPS time epoch k, a covariance matrix (e.g., a 6×6 covariance matrix) of the translation vector of a camera frame with respect to a spatial frame at a past GPS time epoch k, and/or a frame identifier (ID) associated with the current frame. In some configurations, the frame ID may be utilized to identify a frame in accordance with frame sequence, number, and/or time. Optionally, the VIO information may include a raw frame time stamp. In some configurations, the fusion module 336 may receive time stamps for global positioning (e.g., GNSS) measurements and/or VIO information (e.g., measurements) in a common global clock (e.g., GPS time).

The fusion module 336 may provide (e.g., output) fusion information 352. In some configurations, the fusion information 352 may include one or more of the following: global time (e.g., GPS time) and fusion pose information (e.g., camera pose, camera frame pose, electronic device 102 pose, vehicle pose, vehicle body frame pose, etc., in a 6 DOF ECEF coordinate frame). Additionally or alternatively, the fusion information 352 may include a frame ID. In some configurations, the fusion information 352 may include rotation information (e.g., a rotation matrix in ECEF coordinates) and/or translation information (e.g., a translation vector in ECEF coordinates).

The fusion module 336 may fuse global positioning measurements with relative positioning (e.g., VIO) to provide absolute positioning in one or more Earth coordinate frames. For example, GNSS fusion may refer to the fusion of GPS/GNSS raw measurements (e.g., pseudorange, Doppler, and/or carrier phase) with a relative positioning engine such as visual-inertial odometry (VIO) to provide absolute positioning in Earth coordinate frame(s). In some configurations, the fusion module 336 may have two input data interfaces (e.g., a global positioning receiver 322 input interface and a VIO module 320 input interface). The input interface(s) may provide one or more of the inputs (e.g., data elements) described above.

The fusion module may include a pseudorange fusion module 344 and/or a carrier-phase fusion module 346. In some configurations, fusion (e.g., GNSS fusion) may be divided into two stages (e.g., pseudorange fusion and carrier-phase fusion). The two stages may be performed by the pseudorange fusion module 344 and/or the carrier-phase fusion module 346.

The pseudorange fusion module 344 may utilize pseudorange and Doppler measurements (from a rover, for example) and corresponding differential corrections from a reference station. For example, the pseudorange fusion module 344 may perform pseudorange GNSS fusion. Pseudorange fusion (e.g., pseudorange GNSS fusion) may include one or more procedures and/or blocks. For example, post-processing of global positioning (e.g., GNSS) raw measurements may be performed first to compute one or more corrected pseudoranges, expected variance, satellite position, satellite velocity, and/or other additional information. Next, the positioning module 318 (e.g., pseudorange fusion module 344 (e.g., GNSS fusion) or other module) estimates the alignment of a global positioning (e.g., GPS) frame and a VIO frame (e.g., spatial frame) in an online manner. Next, outlier detection may be performed and position (e.g., camera position, electronic device 102 position, vehicle position, rover position, etc.) may be estimated.

In some configurations of the systems and methods disclosed herein, alignment of global positioning (e.g., GPS) and VIO frames may be performed as follows. It should be noted that alignment may be performed by the fusion module 336 (e.g., pseudorange fusion module 344) and/or one or more other modules (e.g., the VIO module 320). To estimate the rotation matrix relating the VIO and global positioning (e.g., GPS) frames, the VIO velocities may be compared with the global positioning (e.g., GPS) Doppler range-rate measurements. If sufficient Doppler range rates are available to solve for the velocity (e.g., vehicle velocity, rover velocity, electronic device 102 velocity, body velocity, etc.) in each epoch, then the rotation matrix may be estimated using an algorithm (e.g., Kabsch algorithm, Wahba algorithm, etc.). In order to deal with velocity outliers from Doppler range rates, a robust variant of the Kabsch algorithm may be performed in some approaches. In order to reduce (e.g., eliminate) the convergence time for alignment relying on velocity change, the gravity estimate from VIO may be utilized.

In some configurations of the systems and methods disclosed herein, outlier detection may be performed as follows. It should be noted that outlier detection may be performed by the fusion module 336 (e.g., pseudorange fusion module 344) and/or one or more other modules (e.g., the VIO module 320). Pseudoranges may be corrupted by two noise sources: multipath due to local reflections (which may be modeled as a Gaussian random variable, for example) and non-line-of-sight (NLOS) noise resulting from blockages and/or reflections (which may be modeled as a nonnegative random variable, for example). For instance, the blockages and/or reflections may result from remote buildings and/or other obstructions. Pseudoranges with non-zero NLOS noise may be outliers and/or may be referred to as outliers.

Some examples of an outlier detection algorithm recursively apply a random sample consensus (RanSaC) approach. For instance, an outlier detection algorithm may keep track of a number of tentative positions (e.g., rover positions). Associated with each tentative position may be pseudoranges that are line-of-sight (LOS)—consistent with the position (e.g., constituting a consensus set in RanSaC terminology). The tentative position with the largest number of associated LOS-consistent pseudoranges may be selected as the final position estimate.

For each epoch, an outlier detection algorithm may perform (e.g., execute) one or more of the following steps. The algorithm may propagate tentative positions to the current time using the VIO velocity estimates (e.g., update the tentative positions with the VIO velocity estimates up to the current time). The algorithm may discard pseudoranges that cannot be LOS consistent with any position. These are measurements that, if LOS, would force other measurements to have negative NLOS noise. These measurements may be found efficiently by solving a linear program. The algorithm may randomly choose a number of (e.g., three) past or current epochs and a number of (e.g., two) pseudoranges from each epoch. Using these observations (e.g., six observations) and the VIO displacement, the algorithm may compute a new tentative position. This procedure may be repeated for a fixed number of times. The algorithm may keep only those tentative positions that are consistent (e.g., that lead to nonnegative estimated NLOS noise components). For each tentative position, the algorithm may find all current and past pseudoranges that are LOS consistent with the position. Tentative positions with few consistent pseudoranges (e.g., less than a threshold number of consistent pseudoranges) may be discarded. The algorithm may recompute each tentative position using all associated LOS-consistent pseudoranges. The algorithm may select the tentative position with the most consistent pseudoranges as the location estimate at the current time.

A carrier-phase fusion module 346 may utilize carrier-phase measurements in addition to pseudorange and Doppler measurements (from a rover, for example). For example, the carrier-phase fusion module 346 may perform carrier-phase GNSS fusion. Differential corrections for these measurements from a reference station may also be utilized. In some configurations, a dual-frequency receiver may be used for challenging scenarios. In some approaches, the initial phase of carrier-phase fusion (e.g., carrier-phase GNSS fusion) may utilize a survey quality antenna for measurements (e.g., GNSS measurements). The antenna characterization may be known (e.g., predetermined). Some configurations of the systems and methods disclosed herein may achieve one or more of the following: relative pose measurements may be outlier-free, relative pose measurements may be always-on, relative pose measurements for position may have a 1% or less drift in a short-term and long-term as a function of distance, and/or relative pose measurements for velocity, gravity, and/or orientation may have small error.

Figure 4:
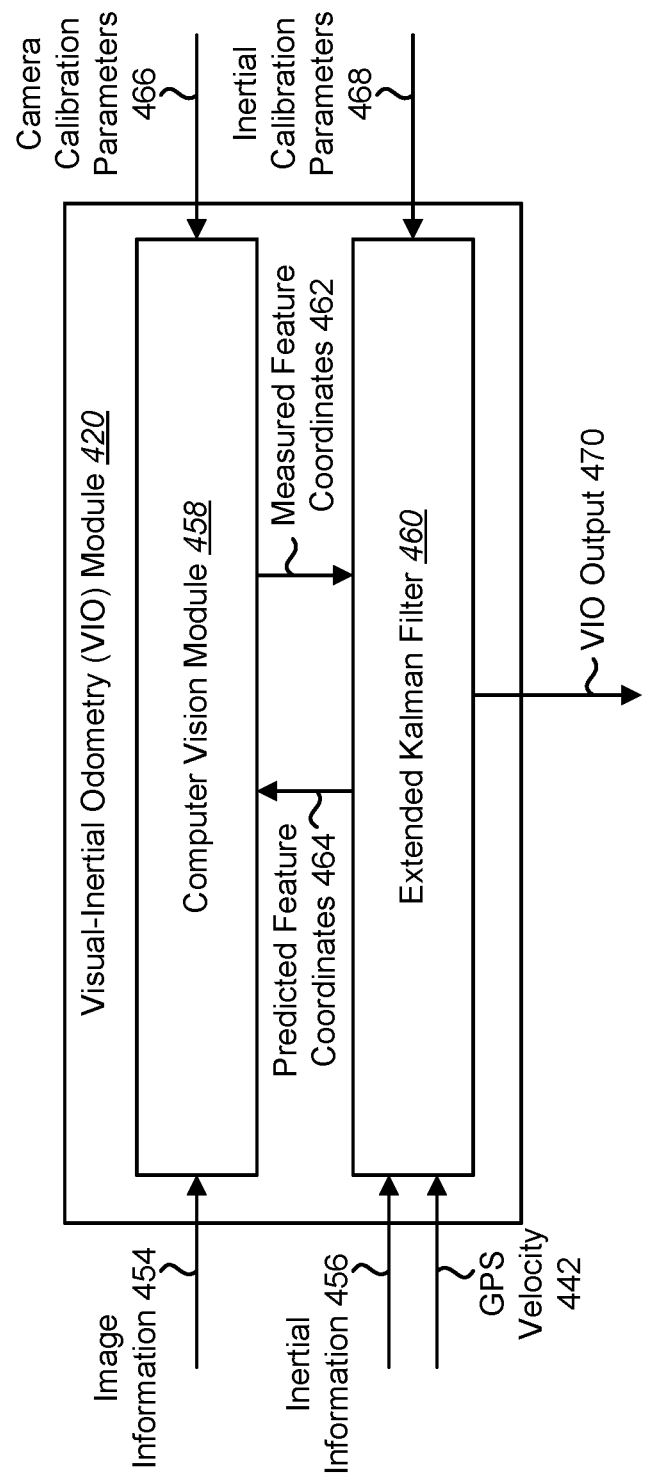
FIG. 4 is a block diagram illustrating one example of a VIO module.

FIG. 4 is a block diagram illustrating one example of a VIO module 420. The VIO module 420 described in connection with FIG. 4 may be an example of the VIO module 320 described in connection with FIG. 3. In some configurations, the VIO module 420 may be implemented in the electronic device 102 described in connection with FIG. 1. The VIO module 420 may include a computer vision module 458 and/or an extended Kalman filter module 460. The VIO module 420 may be implemented in one or more platforms (e.g., mobile platforms, autonomous vehicles, semi-autonomous vehicles, etc.) with one or more use cases (e.g., vehicle control, navigation, augmented reality, robotics, virtual reality, etc.).

The computer vision module 458 may obtain (e.g., receive) image information 454 (e.g., one or more images, camera frames, time stamps, etc.). For example, the computer vision module 458 may receive image information 454 from an image sensor (e.g., camera). The image information 454 may take many forms. As described herein, for example, image information 454 may include image data at Video Graphics Array (VGA) resolution (640×480) or Super VGA (SVGA) resolution, monochrome or color (8 bits or higher, for example), wide-angle or conventional lens, at a frame rate of 30 frames per second (fps), and/or with a timestamp in system time. Other formats may be implemented and/or utilized.

The computer vision module 458 may detect and/or track image features in one or more frames based on the image information 454. In some configurations, the computer vision module 458 may receive camera calibration parameters 466 (e.g., intrinsic camera calibration parameters). For example, the camera calibration parameters 466 may include indications of a focal length, principal points, and/or distortion. In some approaches, the camera calibration parameters 466 may only be received once per camera type. The computer vision module 458 may utilize the camera calibration parameters 466 to improve measurement accuracy by tuning for intrinsic camera characteristics.

In some configurations, the computer vision module 458 may receive predicted 2-dimensional (2D) feature coordinates 464 (e.g., predicted 2D image feature coordinates) from the extended Kalman filter 460. The computer vision module 458 may produce measured 2-dimensional image feature coordinates 462 (e.g., pixel position in the image), which may be provided to the extended Kalman filter 460. In some configurations, the computer vision module 458 may provide time stamps and/or measured noise (of the camera(s), for example), which may be provided to the extended Kalman filter 460.

The extended Kalman filter 460 may receive inertial information 456 (e.g., IMU information, gyroscope measurements, gyroscope time stamps, gyroscope measurement noise, accelerometer measurements, accelerometer time stamps, and/or accelerometer measured noise, etc.). The extended Kalman filter 460 may receive inertial calibration parameters 468 (e.g., camera IMU alignment calibration parameters). The inertial calibration parameters 468 may indicate spatial (e.g., rotation and/or translation) parameters and/or a time parameter. In some approaches, the inertial calibration parameters may be received once per board type. In some configurations, the extended Kalman filter 460 may receive a GPS velocity 442. The GPS velocity 442 may include a speed and/or a heading. The GPS velocity 442 may be received from a global positioning receiver (e.g., the global positioning receiver 122 described in connection with FIG. 1) and/or from a sensor driver. In some configurations, the extended Kalman filter 460 may receive an error (e.g., quality) metric associated with the GPS velocity 442.

The extended Kalman filter 460 may provide (e.g., output) a VIO output 470 (e.g., extended Kalman filter (EKF) output). The VIO output 470 may include one or more informational elements. For example, the VIO output 470 may include a pose (e.g., a camera pose, and electronic device 102 pose, a vehicle pose, a six degrees of freedom (6-DOF) pose, etc.), gravity information (e.g., a gravity vector), one or more feature point locations (e.g., 3-dimensional (3D) locations of feature points), and/or one or more calibration parameters (e.g., bias(es), scale factor(s), alignment, etc.).

For a vehicular (e.g., automotive) use case, one or more of the following points may be factors that the VIO design may accommodate. One factor may be initialization at a fixed position. For example, VIO may operate on a camera that is at a fixed position inside a vehicle. VIO may be able to initialize one or more parameters without moving the device. In some approaches, VIO may be initialized while the electronic device is stationary. Some configurations may provide a warm start capability. Another factor may be the inclusion of vehicle motion constraints (which may be referred to as non-holonomic constraints) into a kinematic model. Another factor may be operation with a wide-dynamic range (WDR) camera, under extreme variations in lighting. For example, this may involve dealing with multiple exposure(s) contributing to each frame (apart from rolling shutter, for instance). Another factor may include dealing effectively with outlier features from moving objects (e.g., large moving objects such as cars in a camera field of view (FOV)). Another factor may include an ability to re-initialize VIO (e.g., the extended Kalman filter (EKF) 460) while moving. Since the pose output of VIO may be used as an input to enhance GPS position estimates, an accurate model for (VIO) pose error may be utilized for fusion purposes. Some approaches may rely on a sliding window implementation in VIO of camera poses corresponding to GPS epochs. Another factor may include calibration procedures for estimating the "lever arm" and/or misalignment between image sensor(s) (e.g., camera(s)), inertial sensor(s) (e.g., IMU), vehicle body frame, and/or global positioning (e.g., GPS) antenna, etc. In some configurations, lever arm (and/or misalignment) parameters may be added to the Kalman filter (e.g., EKF) state and may be estimated as a part of the Kalman filter prediction and update.

Figure 5:
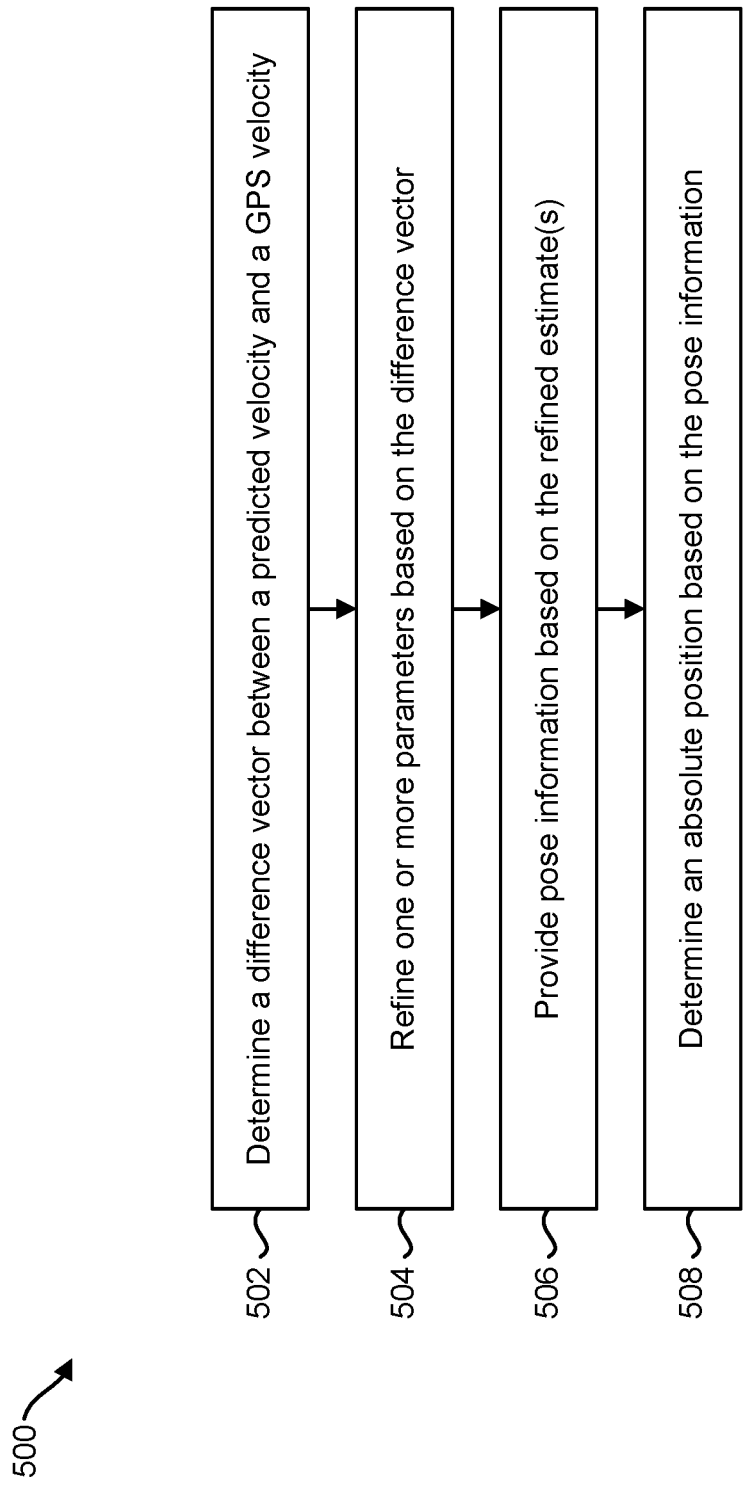
FIG. 5 is a flow diagram illustrating one example of a method for determining an absolute position.

FIG. 5 is a flow diagram illustrating one example of a method 500 for determining an absolute position. The method 500 may be performed by the electronic device 102 described in connection with FIG. 1.

The electronic device 102 may determine 502 a difference vector between a predicted velocity and a GPS velocity. This may be accomplished as described in connection with one or more of FIGS. 1-2.

The electronic device 102 may refine 504 one or more parameters based on the difference vector. This may be accomplished as described in connection with one or more of FIGS. 1-3.

The electronic device 102 may provide 506 pose information based on the refined estimate(s). This may be accomplished as described in connection with one or more of FIGS. 1-4. For example, the electronic device 102 may determine pose information (e.g., camera pose information, electronic device 102 pose information, vehicle pose information, etc.) based on the refined estimate(s). The pose information may indicate a pose in a spatial frame.

The electronic device 102 may determine 508 an absolute position based on the pose information. This may be accomplished as described in connection with FIG. 1. For example, the electronic device 102 may determine an absolute position corresponding to the pose information. For instance, the electronic device 102 may determine global coordinates (e.g., ECEF, ENU, etc.) corresponding to the pose information.

Figure 6:
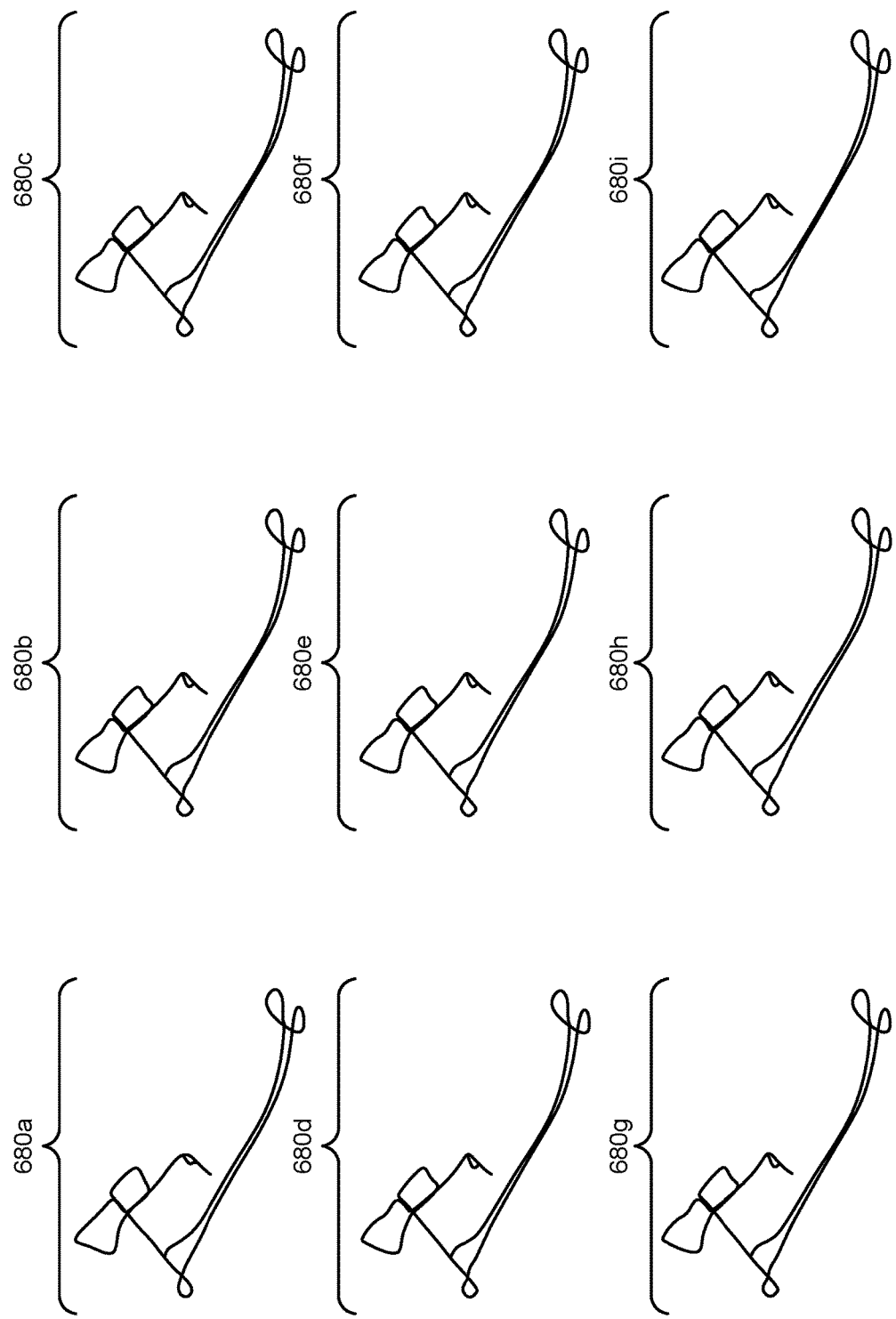
FIG. 6 is a diagram illustrating examples of test driving trajectories utilizing a VIO system.

FIG. 6 is a diagram illustrating examples 680a-i of test driving trajectories utilizing a VIO system. For instance, several examples 680a-i illustrate how some configurations of the systems and methods disclosed herein may perform (using a GPS velocity with VIO, for example). Specifically, FIG. 6 illustrates examples 680a-i of trajectories of driving a 10 kilometer (km) loop. As illustrated in FIG. 6, the examples 680a-i are very similar with low variation.

Figure 7:
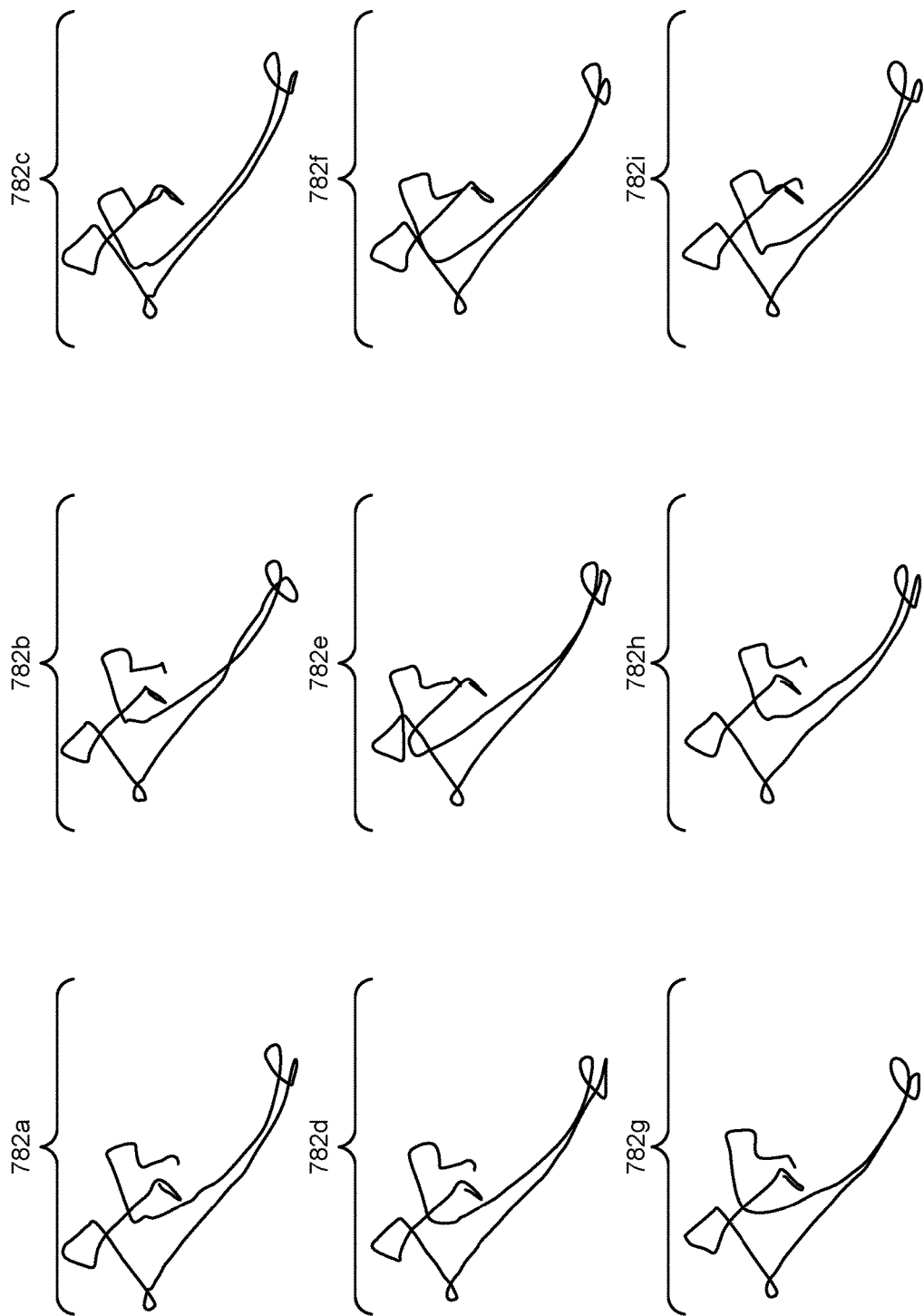
FIG. 7 is a diagram illustrating other examples of test driving trajectories utilizing a VIO system.

FIG. 7 is a diagram illustrating other examples 782a-i of test driving trajectories utilizing a VIO system. FIG. 7 illustrates results of a VIO system that does not use a GPS velocity with VIO. Specifically, FIG. 7 illustrates examples 782a-i of a trajectory of driving the same 10 km loop described in connection with FIG. 6.

A comparison of FIGS. 6 and 7 illustrate that the impact of incorporating GPS velocity may be dramatic in improving robustness of VIO in highway driving and sparse feature scenarios. While all trajectories with GPS velocity are similar, notable distortions are perceived when GPS velocity input is not used as illustrated in FIG. 7.

Specifically, FIGS. 6 and 7 may illustrate multiple drives through the same route. The entire path is a loop of 10 km between exits. FIG. 6 illustrates results using GPS velocity, while FIG. 7 shows VIO without GPS velocity. While all trajectories with GPS velocity are similar as illustrated in FIG. 6, notable distortions are perceived when GPS velocity input is not used as illustrated in FIG. 7. For example, route navigation may be prone to failure without speed or velocity aiding. Route navigation may be more robust with speed aiding, but heading may be wrong for various reasons as illustrated in FIG. 7. Route navigation may be very robust with velocity aiding, as illustrated in FIG. 6.

Figure 8:
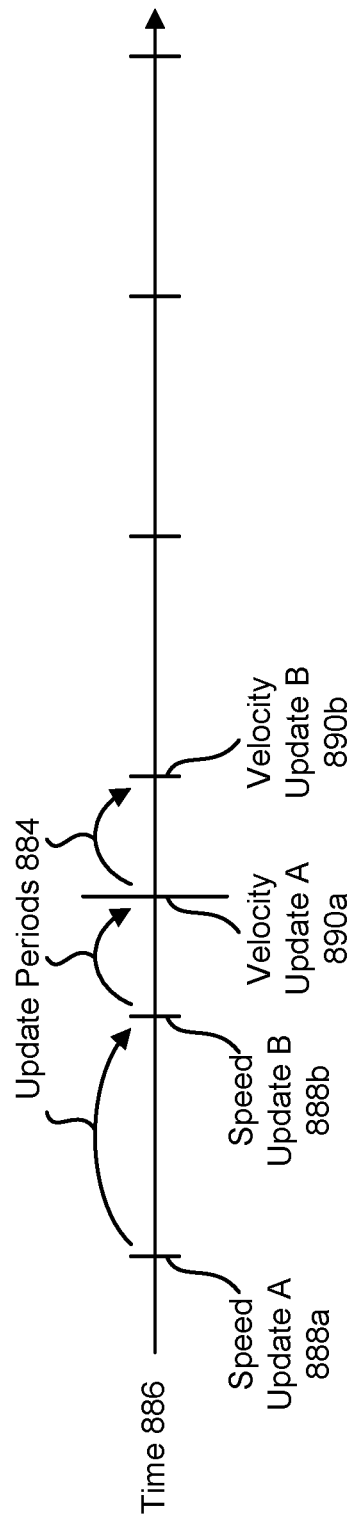
FIG. 8 is a diagram illustrating an example of GPS velocity aiding.

FIG. 8 is a diagram illustrating an example of GPS velocity aiding. This example illustrates a series of update periods 884 over time 886. In this example, assume that the electronic device 102 (e.g., a vehicle) starts initialization procedures (to determine pose information, for instance). At startup, the electronic device 102 (e.g., vehicle) may have insufficient speed to estimate $R_{ns}$. Accordingly, the electronic device 102 (e.g., positioning module 118) may start with speed aiding. As illustrated in FIG. 8, speed update A 888a and speed update B 888b may be determined and utilized to determine pose information.

The electronic device 102 may collect $V_{sb}$, $V_n$, $\gamma^s$, and $\gamma^n$, where $\gamma^s$ is a gravity vector represented in the spatial frame and $\gamma^n$ is a gravity vector represented in the 'N' frame. Once a certain speed is reached (e.g., at least 10 m/s), $R_{ns}$ may be estimated (using the Kabsh algorithm, for example). Once $R_{ns}$ is initialized, 3D velocity may be used for subsequent aiding. As illustrated in FIG. 8, for example, velocity update A 890a and velocity update B 890b, etc., may be used for an EKF update.

In some configurations, the rotation matrix (e.g., $R_{ns}$) may be estimated (e.g., initialized) in accordance with the following approach (or a different approach). In particular, an example of aligning a visual-inertial odometry (VIO) reference frame (e.g., a spatial reference frame) with a global positioning (e.g., satellite positioning system (SPS)) reference frame is given as follows. A positioning module (e.g., positioning module 118, positioning module 318, etc.) may obtain range-rate measurements from a global positioning receiver (e.g., global positioning receiver 122), where the range-rate measurements are with respect to a global reference frame. In one aspect, the global positioning receiver provides the raw range-rate measurements from different satellites during each epoch of a length of one second. The tropospheric, ionospheric, and satellite clock biases may be assumed to be corrected in these range-rate measurements, either through standard modules used in single-point solutions or from network data. The corrected range-rate measurements may be modeled as:

$$\dot{p}_s \triangleq \nabla_s^T(t)(v(t) - v_s(t)) + \dot{b}(t) + w_s(t) \quad (5)$$

where, $$\nabla_s(t) \triangleq \frac{(\tilde{x}(t) - x_s(t))}{\|\tilde{x}(t) - x_s(t)\|} \quad (6)$$

is the unit vector from the satellite position $x_s(t)$ of satellite s to a coarse estimate $\tilde{x}(t)$ of the mobile platform (e.g., electronic device 102) position $x(t)$. $v(t)$ and $v_s(t)$ are velocities of the mobile platform (e.g., electronic device 102) and the satellite s, respectively, $\dot{b}(t)$ is the receiver clock drift of global positioning receiver, and $w_s(t)$ captures all other noise in the measurements. Such a coarse position estimate, accurate to within, e.g., 200 m, can be computed using standard models.

Next, the positioning module may obtain VIO velocity measurements from a VIO module (e.g., VIO module 120, VIO module 320, VIO module 420, etc.), where the VIO velocity measurements are with respect to a local reference frame (e.g., a spatial reference frame). The VIO module may utilize images generated by a camera (e.g., image sensor(s) 104) as well as data provided by one or more inertial sensors (e.g., inertial sensors 114, accelerometer and gyroscope, etc.) to generate VIO velocity measurements. The VIO velocity measurements generated by the VIO module may be a vector of velocities and rotation matrices at each time instant along with estimates of the variances. The rate at which the VIO velocity measurements are generated by VIO module may be higher (e.g., 100 Hz) than the rate of the global positioning measurements generated by global positioning receiver (e.g., 1 Hz, 5 Hz, 10 Hz, etc.). The rotation matrices included in the VIO velocity measurements describe the camera orientation at the current time instant with respect to an initial camera reference frame. In some configurations, the VIO velocity measurements may be accurate and have a drift of around 1% as a function of distance, i.e., an error of 1 m over 100 m.

The VIO module provides the positioning module with VIO velocity measurements in the local reference frame that may be arbitrarily chosen at system startup. In order to integrate the VIO velocity measurements with the global positioning measurements (e.g., GPS velocity), the positioning module may determine at least one orientation parameter (e.g., may estimate a rotation matrix) to align the local reference frame with the global reference frame. In some configurations, aligning the local reference frame with the global reference frame includes translating the VIO velocity measurements into the global reference frame. To estimate the orientation parameter, such as the rotation matrix, the positioning module may obtain the global positioning measurements in the global reference frame that relate to the VIO velocity measurements in the local reference frame. For example, range-rate measurements (e.g., Doppler range-rate measurements) obtained from the global positioning receiver can be used for this purpose. Once the orientation parameter (e.g., rotation matrix) is determined, the VIO velocity measurements can be translated into the global reference frame.

As mentioned above, in one aspect, the global positioning measurements provided by the global positioning receiver may include GPS velocity measurements (e.g., SPS velocity measurements, GPS Doppler velocity measurements, etc.) that are representative of a velocity of the mobile platform (e.g., electronic device 102). When the mobile platform is in an open-sky environment, the GPS velocity measurements are relatively accurate. Using the GPS velocity measurements to determine the orientation parameter may provide a closed-form solution. It should be noted that the orientation parameter may or may not change significantly over time, as in the case of a vehicle, where changes in the orientation parameter may be mainly due to a slow drift associated with the VIO module as well as possible resets of the reference frame used by the VIO module. Thus, utilizing the GPS velocity measurements may be used by the mobile platform whenever good quality GPS velocity measurements are available from global positioning receiver.

Continuing with this example, let $v(t)$ equal the true velocity of mobile platform (e.g., electronic device 102) in the global reference frame, let $v_G(t)$ equal the GPS velocity measurement from the global positioning receiver, and let $v_V(t)$ equal the VIO velocity measurement obtained from the VIO module. Thus, these parameters may be modeled as $$v_G(t) \triangleq v(t) + z_G(t),$$

$$v_V(t) \triangleq Rv(t) + z_V(t) \quad (7a)$$

where R (e.g., $R_{ns}$) is the rotation matrix relating the global and local reference frames and where the respective noises in the measurements are denoted by $z_G(t)$ and $z_V(t)$. In one aspect, the positioning module estimates the rotation matrix R over a window size of T. For example, consider a set of measurements in the time interval $\{t-T+1, t-T+2, \ldots t\}$. This expression assumes for ease of notation that time is discretized into units of seconds. Equations 7a may then be rewritten over this window as follows, $$V_G = V + Z_G$$

$$V_V = RV + Z_V \quad (7b)$$

where $V \triangleq (v(t-T+1), \ldots, v(t))$ and the matrices $V_G$, $V_V$, $Z_G$, and $Z_V$ are defined analogously. The positioning module may then estimate the rotation matrix R as the minimizer of the following least-squares optimization problem, $$\underset{Q \in R^{3\times 3}}{\text{minimize}} \|QV_G - V_V\|_F^2 \quad (7c)$$

subject to $$Q^T Q = I,$$

$$\det(Q) = 1$$

where $\|.\|_F$ denotes the Frobenius norm. In one aspect, this problem is a special case of the orthogonal Procrustes problem, where the Kabsch algorithm may provide an optimal closed-form solution, as follows:

$$U_1 \sum U_2^T \triangleq svd(V_V V_G^T) \quad (7d)$$

$$d \triangleq \text{sign}(\det(U_2 U_1^T)),$$

$$\hat{R} = U_2 \begin{pmatrix} 1 & 0 & 0 \\ 0 & 1 & 0 \\ 0 & 0 & d \end{pmatrix} U_1^T,$$

where svd denotes the singular value decomposition and det the determinant.

The Kabsch algorithm can be extended to minimize the weighted Frobenius norm $\|(QV_G - V_V)W^{1/2}\|_F^2$ for some symmetric positive-semidefinite matrix W by computing Equation 7e as follows:

$$U_1 \Sigma U_2^T \triangleq svd(V_V W V_G^T) \quad (7e)$$

The remainder of the Kabsch algorithm stays as before. This weighted version of the Kabsch algorithm may be used as a building block for an iteratively reweighted least-squares procedure. For example, the positioning module may start with W=I and then compute a first estimate $\hat{R}$ of the rotation matrix R. Using this estimate, the positioning module may then computes the residuals $\hat{R}V_G - V_V$. From these residuals, the positioning module may compute a new weight matrix W. For example, a standard bisquare weight function can be used for this purpose. The positioning module may repeat this calculation (e.g., 5 times). This iteratively reweighted least-squares approach downweights measurements with large residuals, thereby providing robustness to outliers.

Figure 9:
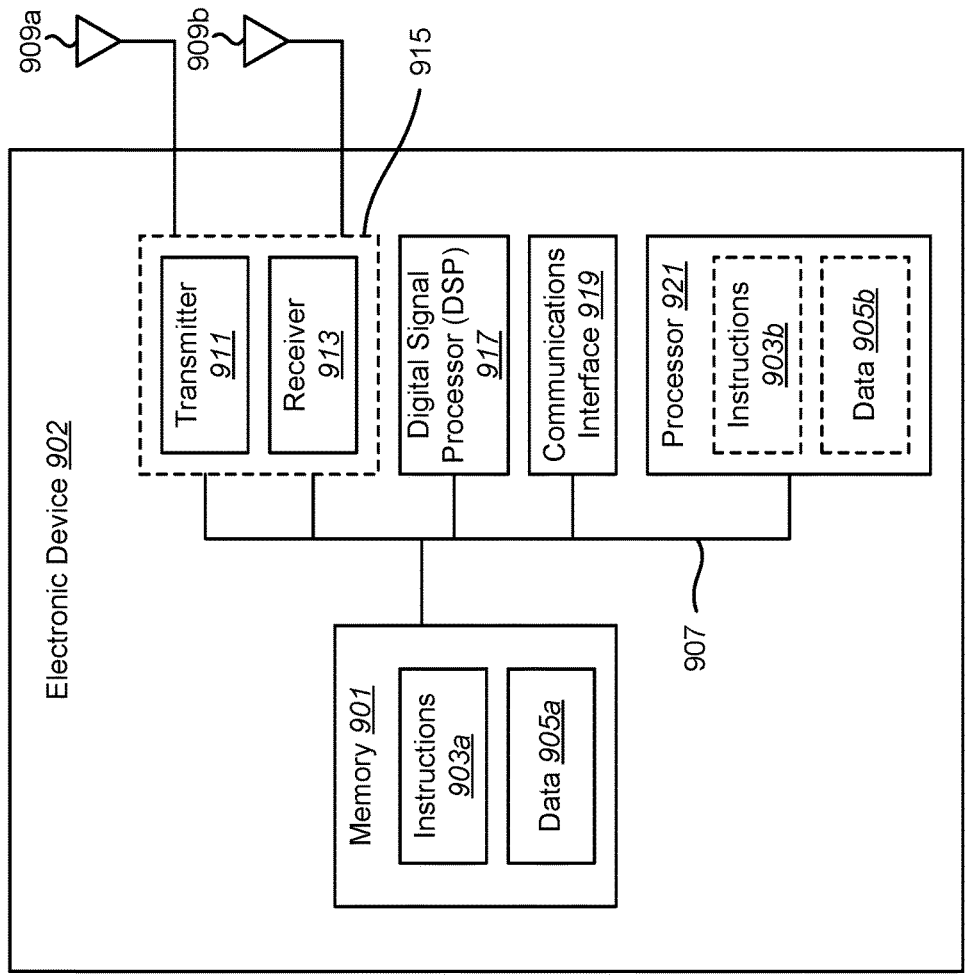
FIG. 9 illustrates certain components that may be included within an electronic device configured to implement various configurations of the systems and methods disclosed herein.

FIG. 9 illustrates certain components that may be included within an electronic device 902 configured to implement various configurations of the systems and methods disclosed herein. Examples of the electronic device 902 may include servers, cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, mounted cameras, connected cameras, robots, aircraft, drones, unmanned aerial vehicles (UAVs), gaming consoles, personal digital assistants (PDAs), etc. The electronic device 902 may be implemented in accordance with one or more of the electronic devices described herein.

The electronic device 902 includes a processor 921. The processor 921 may be a general purpose single- or multi-chip microprocessor (e.g., an ARM), a special purpose microprocessor (e.g., a digital signal processor (DSP)), a microcontroller, a programmable gate array, etc. The processor 921 may be referred to as a central processing unit (CPU). Although just a single processor 921 is shown in the electronic device 902, in an alternative configuration, a combination of processors (e.g., an ARM and DSP) could be implemented.

The electronic device 902 also includes memory 901. The memory 901 may be any electronic component capable of storing electronic information. The memory 901 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 905a and instructions 903a may be stored in the memory 901. The instructions 903a may be executable by the processor 921 to implement one or more of the methods, procedures, steps, and/or functions described herein. Executing the instructions 903a may involve the use of the data 905a that is stored in the memory 901. When the processor 921 executes the instructions 903, various portions of the instructions 903b may be loaded onto the processor 921 and/or various pieces of data 905b may be loaded onto the processor 921.

The electronic device 902 may also include a transmitter 911 and/or a receiver 913 to allow transmission and reception of signals to and from the electronic device 902. The transmitter 911 and receiver 913 may be collectively referred to as a transceiver 915. One or more antennas 909a-b may be electrically coupled to the transceiver 915. The electronic device 902 may also include (not shown) multiple transmitters, multiple receivers, multiple transceivers and/or additional antennas.

The electronic device 902 may include a digital signal processor (DSP) 917. The electronic device 902 may also include a communications interface 919. The communications interface 919 may allow and/or enable one or more kinds of input and/or output. For example, the communications interface 919 may include one or more ports and/or communication devices for linking other devices to the electronic device 902. In some configurations, the communications interface 919 may include the transmitter 911, the receiver 913, or both (e.g., the transceiver 915). Additionally or alternatively, the communications interface 919 may include one or more other interfaces (e.g., touchscreen, keypad, keyboard, microphone, camera, etc.). For example, the communication interface 919 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 907.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. It should also be noted that one or more steps and/or actions may be added to the method(s) and/or omitted from the method(s) in some configurations of the systems and methods disclosed herein.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and electronic device described herein without departing from the scope of the claims.

What is claimed is:

1. A method performed by an electronic device, comprising:
    determining a predicted velocity relative to Earth corresponding to a first epoch using a camera and an inertial measurement unit (IMU);
    determining, using a Global Positioning System (GPS) receiver, a GPS velocity relative to Earth;
    determining a difference vector between the predicted velocity and the GPS velocity;
    refining a bias estimate and a scale factor estimate of IMU measurements proportional to the difference vector;
    refining a misalignment estimate between the camera and the IMU based on the difference vector; and
    providing pose information based on the refined bias estimate, the refined scale factor estimate, and the refined misalignment estimate.

2. The method of claim 1, further comprising determining a second predicted velocity corresponding to a second epoch using the camera and the IMU based on the refined bias estimate, the refined scale factor estimate, and the refined misalignment estimate.

3. The method of claim 1, wherein the misalignment estimate comprises a translation displacement estimate and a rotation displacement estimate.

4. The method of claim 1, further comprising:
    obtaining an error metric indicating an uncertainty in the GPS velocity; and
    weighting the GPS velocity in a Kalman filter based on the error metric.

5. The method of claim 1, wherein a predicted velocity error is bounded based on the GPS velocity.

6. The method of claim 1, wherein the GPS velocity is utilized to reduce visual-inertial odometry (VIO) drift.

7. The method of claim 1, further comprising rejecting at least one of a set of GPS velocities based on at least one of a set of difference vectors.

8. The method of claim 1, further comprising rejecting at least one of a set of GPS velocities based on an error metric.

9. The method of claim 1, wherein the pose information comprises a 6 degrees of freedom (DOF) camera pose.

10. The method of claim 1, wherein a vehicle comprises the electronic device.

11. An electronic device, comprising:
a memory;
a processor coupled to the memory, wherein the processor is configured to:
   determine a predicted velocity relative to Earth corresponding to a first epoch using a camera and an inertial measurement unit (IMU);
   determine, using a Global Positioning System (GPS) receiver, a GPS velocity relative to Earth;
   determine a difference vector between the predicted velocity and the GPS velocity;
   refine a bias estimate and a scale factor estimate of IMU measurements proportional to the difference vector;
   refine a misalignment estimate between the camera and the IMU based on the difference vector; and
   provide pose information based on the refined bias estimate, the refined scale factor estimate, and the refined misalignment estimate.

12. The electronic device of claim 11, wherein the processor is configured to determine a second predicted velocity corresponding to a second epoch using the camera and the IMU based on the refined bias estimate, the refined scale factor estimate, and the refined misalignment estimate.

13. The electronic device of claim 11, wherein the misalignment estimate comprises a translation displacement estimate and a rotation displacement estimate.

14. The electronic device of claim 11, wherein the processor is configured to:
   obtain an error metric indicating an uncertainty in the GPS velocity; and
   weight the GPS velocity in a Kalman filter based on the error metric.

15. The electronic device of claim 11, wherein the processor is configured to bound a predicted velocity error based on the GPS velocity.

16. The electronic device of claim 11, wherein the processor is configured to use the GPS velocity to reduce visual-inertial odometry (VIO) drift.

17. The electronic device of claim 11, wherein the processor is configured to reject at least one of a set of GPS velocities based on at least one of a set of difference vectors.

18. The electronic device of claim 11, wherein the processor is configured to reject at least one of a set of GPS velocities based on an error metric.

19. The electronic device of claim 11, wherein the pose information comprises a 6 degrees of freedom (DOF) camera pose.

20. The electronic device of claim 11, wherein a vehicle comprises the electronic device.

21. A non-transitory tangible computer-readable medium storing computer executable code, comprising:
code for causing an electronic device to determine a predicted velocity relative to Earth corresponding to a first epoch using a camera and an inertial measurement unit (IMU);
code for causing the electronic device to determine, using a Global Positioning System (GPS) receiver, a GPS velocity relative to Earth;
code for causing the electronic device to determine a difference vector between the predicted velocity and the GPS velocity;
code for causing the electronic device to refine a bias estimate and a scale factor estimate of IMU measurements proportional to the difference vector;
code for causing the electronic device to refine a misalignment estimate between the camera and the IMU based on the difference vector; and
code for causing the electronic device to provide pose information based on the refined bias estimate, the refined scale factor estimate, and the refined misalignment estimate.

22. The computer-readable medium of claim 21, further comprising code for causing the electronic device to determine a second predicted velocity corresponding to a second epoch using the camera and the IMU based on the refined bias estimate, the refined scale factor estimate, and the refined misalignment estimate.

23. The computer-readable medium of claim 21, further comprising:
code for causing the electronic device to obtain an error metric indicating an uncertainty in the GPS velocity; and
code for causing the electronic device to weight the GPS velocity in a Kalman filter based on the error metric.

24. The computer-readable medium of claim 21, further comprising code for causing the electronic device to reject at least one of a set of GPS velocities based on at least one of a set of difference vectors.

25. The computer-readable medium of claim 21, further comprising code for causing the electronic device to reject at least one of a set of GPS velocities based on an error metric.

26. An apparatus, comprising:
means for determining a predicted velocity relative to Earth corresponding to a first epoch using a camera and an inertial measurement unit (IMU);
means for determining a GPS velocity relative to Earth;
means for determining a difference vector between the predicted velocity and the GPS velocity;
means for refining a bias estimate and a scale factor estimate of IMU measurements proportional to the difference vector;
means for refining a misalignment estimate between the camera and the IMU based on the difference vector; and
means for providing pose information based on the refined bias estimate, the refined scale factor estimate, and the refined misalignment estimate.

27. The apparatus of claim 26, further comprising means for determining a second predicted velocity corresponding to a second epoch using the camera and the IMU based on the refined bias estimate, the refined scale factor estimate, and the refined misalignment estimate.

28. The apparatus of claim 26, further comprising:
means for obtaining an error metric indicating an uncertainty in the GPS velocity; and
means for weighting the GPS velocity in a Kalman filter based on the error metric.

29. The apparatus of claim 26, further comprising means for rejecting at least one of a set of GPS velocities based on at least one of a set of difference vectors.

30. The apparatus of claim 26, further comprising means for rejecting at least one of a set of GPS velocities based on an error metric.

\* \* \* \* \*